United States Patent [19]

Ujita et al.

[11] Patent Number: 5,306,154
[45] Date of Patent: Apr. 26, 1994

[54] INTELLIGENT EDUCATION AND SIMULATION SYSTEM AND METHOD

[75] Inventors: Hiroshi Ujita, Tokyo; Takeshi Yokota, Hitachi; Kanji Kato, Katsuta; Toichi Shida; Nasho Tanikawa, both of Hitachi; Toshiya, Kurakake, Yokohama, all of Japan

[73] Assignee: Hitachi, Ltd., Tokyo, Japan

[21] Appl. No.: 846,786

[22] Filed: Mar. 5, 1992

[30] Foreign Application Priority Data

Mar. 7, 1991 [JP] Japan .................................. 3-41572

[51] Int. Cl.⁵ ........................ G09B 9/00; G09B 25/02
[52] U.S. Cl. .................................. 434/218; 434/219;
434/323; 434/362; 364/578; 395/915; 395/927;
376/216
[58] Field of Search ............... 434/218, 219, 223, 234,
434/307, 308, 322, 323, 350, 362, 365, 366, 369;
364/419, 492, 578, 184, 188, 189; 395/77, 915,
927; 376/215–217

[56] References Cited

U.S. PATENT DOCUMENTS

| | | | |
|---|---|---|---|
| 4,042,813 | 8/1977 | Johnson | 364/578 X |
| 4,538,994 | 9/1985 | Suzuki et al. | 434/219 |
| 4,613,952 | 9/1986 | McClanahan | 434/219 X |
| 4,764,120 | 8/1988 | Griffin et al. | 434/350 X |
| 4,867,655 | 9/1989 | Brush et al. | 434/234 |
| 5,059,127 | 10/1991 | Lewis et al. | 434/353 |
| 5,170,362 | 12/1992 | Greenberg et al. | 364/550 |
| 5,180,309 | 1/1991 | Egnor | 434/353 X |

FOREIGN PATENT DOCUMENTS

| | | | |
|---|---|---|---|
| 0096983 | 4/1991 | Japan | 434/72 |
| 3-13767 | 6/1991 | Japan . | |
| 3-148691 | 6/1991 | Japan . | |

Primary Examiner—Richard J. Apley
Assistant Examiner—Joe H. Cheng
Attorney, Agent, or Firm—Evenson, McKeown, Edwards & Lenahan

[57] ABSTRACT

An intelligent education and simulation system which is capable of executing an optimized follow-up reeducation to the learner reflecting his/her idiosyncrasy toward understanding in learning. The intelligent education and simulation system has an execution instruction to execute a curriculum comprising a plurality of instruction courses regarding the subject teaching of an educational object and its simulation-based instruction. According to this execution instruction, intelligent computer assisted instruction of the subject teaching and the simulation-based instruction are implemented. The degree of understanding of these instructions by the learner is evaluated, and according to the degree of understanding thus comprehended, a pertinent follow-up instruction course(s) is chosen for reeducation. In this way, a pertinent reeducation instruction course(s) optimized for each learner is capable of being selected, and the time required for reeducation of the learner is minimized.

17 Claims, 18 Drawing Sheets

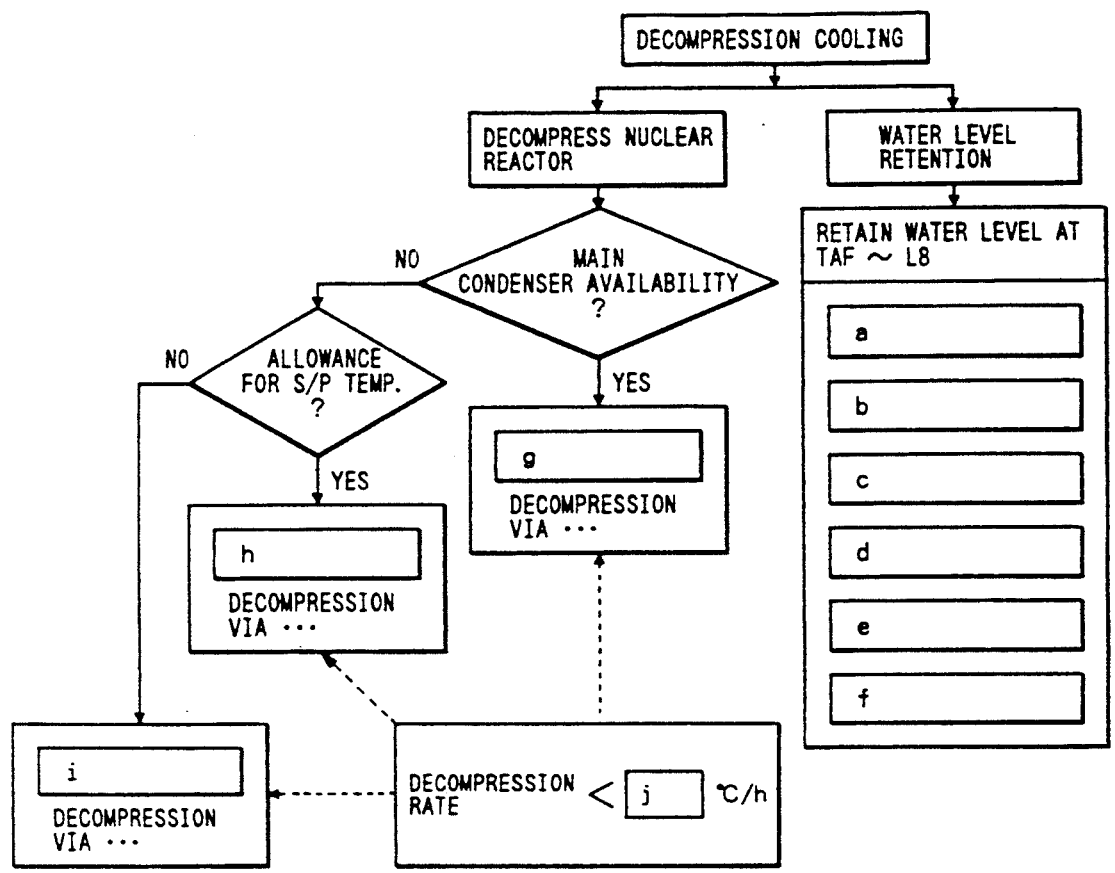

| OPERATION QUIDELINE / SCENARIO NO. | "REACTIVITY CONTROL" | "HIGH PRESSURE STATE" | "WATER LEVEL DECREASING" |
|---|---|---|---|
| 1 (TITLE OF SCENARIOS) | ○ |  | ○ |
| 2 |  | ○ |  |
| 3 |  |  |  |
| 4 | ○ |  | ○ |
| 5 | ○ | ○ |  |

FIG. 11

| FRAME | SLOT | FACET | VALUE | EXPLANATION |
|---|---|---|---|---|
| EVENT | AKO | | GOAL OF OPERATION | |
| | (IF CLAUSE) | (SUCCESSION FROM UPPER LVEL KNOWLEDGE) | | |
| | THEN | STANDARD | STANDARD OPERATIONAL PROCEDURE | PROCEDURES OF "CORRECT OPERATIONS" |
| | | ALTERNATE 1 | ALTERNATIVE OPERATIONAL PROCEDURE | |
| | EFFECT | SUCCESS | EVENT ARISING FROM CORRECT OPERATION | "EFFECTS CAUSED BY OPERATIONS" |
| | | PREMATURE | EVENT ARISING FROM PREMATURED OPERATION | |
| | | FAIL | EVENT ARISING FROM ERRONEOUS OPERATION | |
| | RANGE | TILL | RANGE OF OPERATION PERMITTED FOR EVENT | SEARCH RANGE SET UP |
| | | DURING | TIME PERMITTED FOR OPERATION | |
| | | TRIGGER | EVENT TRIGGERING TIME | |

FIG. 15

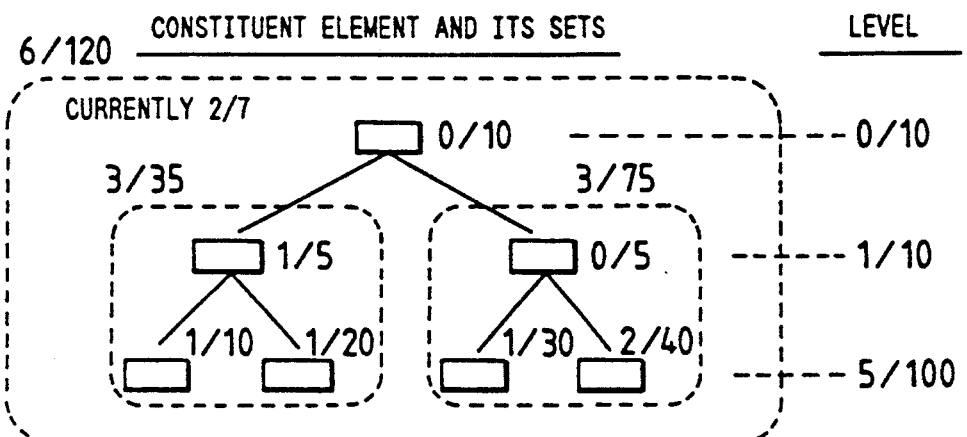

PERFORMANCE APPRAISAL

- YOU HAVE CORRECTLY OPERATED 5 TIMES IN 7 TIMES TRIALS IN "DECOMPRESSION COOLING" OPERATIONS IN "SIMULATION INSTRUCTIONS."

- YOU HAVE ERRED ONLY ONE QUESTION OUT OF 28 WHICH HAS BEEN CONDUCTED REGARDING "DECOMPRESSION COOLING" IN SUBJECT LEARNING.
  IN YOUR ACTUAL OPERATIONS COPING WITH SIMULATION BEHAVIORS, HOWEVER, YOU HAVE MADE TIMING ERRORS TWICE OUT OF 7 TRIALS.

ADVICE

- YOU'D BETTER TAKE FOLLOW-UP REEDUCATION OF "SIMULATION INSTRUCTION."

FIG. 18

| ERROR MODES | INDIVIDUAL STUDENT'S LEVEL | AVERAGE STUDENT'S LEVEL | DIFFERENCE | JUDGE |
|---|---|---|---|---|
| CARELESS MISTAKE | 95 | 95 | 100 | FAIR |
| MISCOMPREHENSION IN THE CONNECTION RELATIONS OF THE FUNCTIONS | 51 | 72 | 70 | POOR |
| UNABLE TO SHOW A DETERMINATE DIRECTION | 81 | 90 | 90 | FAIR |
| MISCOMPREHENSION OF CONCEPT | 73 | 75 | 97 | FAIR |
| LACK OF KNOWLEDGE | 81 | 83 | 98 | FAIR |
| INSUFFICIENT UNDERSTANDING OF THE GUIDELINES | 72 | 77 | 94 | FAIR |
| INSUFFICIENT UNDERSTANDING OF PHYSICAL BEHAVIORS | 65 | 72 | 90 | FAIR |
| STATUS JUDGMENT ERROR | 77 | 80 | 96 | FAIR |
| TIMING ERROR | 59 | 70 | 84 | FAIR |

FIG. 19

| ERROR TYPES | INDIVIDUAL STUDENT'S LEVEL | AVERAGE STUDENT'S LEVEL | DIFFERENCE | JUDGE |
|---|---|---|---|---|
| BASIC CONCEPT COURSE | 79 | 86 | 92 | FAIR |
| PROCEDURE COURSE | 79 | 81 | 98 | FAIR |
| SIMULATION COURSE | 65 | 75 | 87 | POOR |

FIG. 20

| | | | UNDERSTANDING LEVEL FOR EACH ERROR TYPE | | | |
|---|---|---|---|---|---|---|
| | | | GOOD OR FAIR | POOR | | |
| | | | | BASIC CONCEPT COURSE | PROCEDURE COURSE | SIMULATION COURSE |
| UNDERSTANDING LEVEL FOR EACH ERROR MODE | | GOOD OR FAIR | NO FEEDBACK | K | TG | K, S |
| | POOR | CARELESS MISTAKE | TG, TH | K | TG, TH | S |
| | | MISCOMPREHENSION IN THE CONNECTION RELATIONS OF THE FUNCTIONS | K, TG | K | K, TG | K, TG, SG |
| | | UNABLE TO SHOW A DETERMINATE DIRECTION | K, TG | K | K, TG | SG, SR |
| | | MISCOMPREHENSION OF CONCEPT | K | K | TG | K, SG |
| | | LACK OF KNOWLEDGE | K, TG | K | TG | K, SG |
| | | INSUFFICIENT UNDERSTANDING OF THE GUIDELINES | K, TG | K | K, TG | TG |
| | | INSUFFICIENT UNDERSTANDING OF PHYSICAL BEHAVIORS | K, S | K | K, TG | S |
| | | STATUS JUDGMENT ERROR | TG, S | K | TG | TG, S |
| | | TIMING ERROR | S | K, S | TG, S | S |

ABBREVIATION FOR REEVALUATION COURSE

K: BASIC CONCEPT COURSE
TH: PROCEDURE DISPLAY COURSE
TG: PROCEDURE LEARNING COURSE
S: ALL SIMULATION COURSE
SG: SIMULATOR-BASED LEARNING COURSE
SR: RANDOM SIMULATION COURSE
SJ: FREE SIMULATION COURSE

INTELLIGENT EDUCATION AND SIMULATION SYSTEM AND METHOD

BACKGROUND OF THE INVENTION

The present invention relates to an educational system, and more particularly, to an educational system which is suitable for teaching operational procedures in a plant, and physical behaviors in the plant by using a simulator. A known simulation-based instruction such as a training system as shown in "Intelligent Training System GTS-PDTS" (Symposium on the New Approaches to Computer Utilization in Education) focuses on the teaching of plant operations and its system flow through the teaching of related subject knowledge in conjunction with its simulator instruction. In that system, education through simulation is performed after the learning step of the subject knowledge is completed. Also, at each step of the teaching or education, a related education corresponding to the degree of understanding by a learner is offered using a bug model as a learner's model.

The learner's model used in the above known system only contains the learner's achievement test data in the exams on the subject knowledge and the learner's erroneous operation data, respectively. In the known education system, the subject knowledge teaching and the simulation teaching are offered independently, thus without effecting mutual interference or interaction to be taken responding to the degree of understanding by the learner. It therefore lacks flexibility in a sense of a more efficient overall education. Thus, there has been a problem that the subject domain knowledge and the knowledge on the actual plant behaviors are difficult to be matched or correlated. Among learners, some are more adept at learning through subject domain teaching, while others are more adept at learning through simulator teaching. It will be a burden for those who are adept at learning through subject teaching simply to be forced uniformly to take both the subject teaching and the simulator teaching. The same occurs to those who are adept at learning through simulator teaching when they are simply forced uniformly to take both the subject teaching and the simulator teaching.

SUMMARY OF THE INVENTION

An object of the present invention is to provide an educational system which is capable of implementing an optimized reeducation capable of reflecting idiosyncrasies of learners in their understanding capabilities.

This and other objects are capable of being accomplished by providing in combination: educational instruction means for issuing an instruction to execute a curriculum containing a plurality of educational contents through the subject teaching of an educational object and its simulation teaching; subject teaching execution means for outputting information corresponding to said subject teaching on the display unit in accordance with the above execution instruction; a simulator for performing a simulation with the above subject teaching information complying with the above execution instruction, and outputting the information obtained through the simulation onto the above display unit; comprehension means for comprehending the degree of understanding by the learner of said teaching according to the information entered into the input unit by the learner with respect to the above subject teaching and the simulation teaching, respectively; and follow-up re-educational means for choosing part of the teaching to be reeducated according to the degree of the understanding obtained hereinabove.

According to the present invention, the subject teaching and the simulation teaching are performed complying with an instruction to execute a curriculum containing a plurality of educational contents through the subject teaching of an educational object and its simulation. The understanding by the learners of the teaching are evaluatable beforehand or concurrently, with the degrees of understanding reflecting the idiosyncracies of the learners who are adept at learning through the subject teaching and who are adept at learning through simulator teaching are obtainable, respectively. Thereby, an optimized reeducation option may be chosen for each learner since portions of the teaching needing reeducation can be selected according to the degree of understanding hereinabove obtained. Hence, for each learner, time for follow-up reeducation can be minimized.

Because the present embodiment of the invention is provided with the instruction strategy modification unit, dispersion in the degrees of understanding among learners is capable of being minimized. That is, an average degree of understanding is capable of being maximized for learners who have been instructed through the present embodiment of the invention. A learner's model utilized in this embodiment is common with respect to the subject domain instruction and the simulation-based instruction, however, different learner's models may be utilized, respectively. Comparison and evaluation of both will yield the same effect as above.

According to the present invention, the portion of the curriculum requiring reeducation is selected in accordance with the degree of understanding of the learner and accounting for his/her idiosyncrasy in learning, so that a pertinent reeducation optimized for each learner is capable of being executed, and a time for implementing such reeducation is capable of being minimized.

Other objects, advantages and novel features of the present invention will become apparent from the following detailed description of the invention when considered in conjunction with the accompanying drawings.

BRIEF DESCRIPTION OF THE DRAWINGS

FIG. 6A shows an example of an operation procedure.

FIG. 6B illustrates examples of questions for an exam regarding the operation procedure of FIG. 6A.

FIG. 11 explains a set of knowledge regarding corresponding operations to be utilized in estimating operation errors.

FIG. 15 illustrates an example of display screens showing instruction guidance to be displayed when a full course of instruction has been completed.

FIG. 18 illustrates an exemplary table for an individual learning regarding the learner's understanding level for each error mode.

FIG. 19 illustrates an exemplary table for an individual learning regarding the learner's understanding level for each error type.

FIG. 20 illustrates a table which provides a tutorial strategy in dependance on the entries of FIGS. 18 and 19.

DETAILED DESCRIPTION OF THE DRAWINGS

Figure 1:
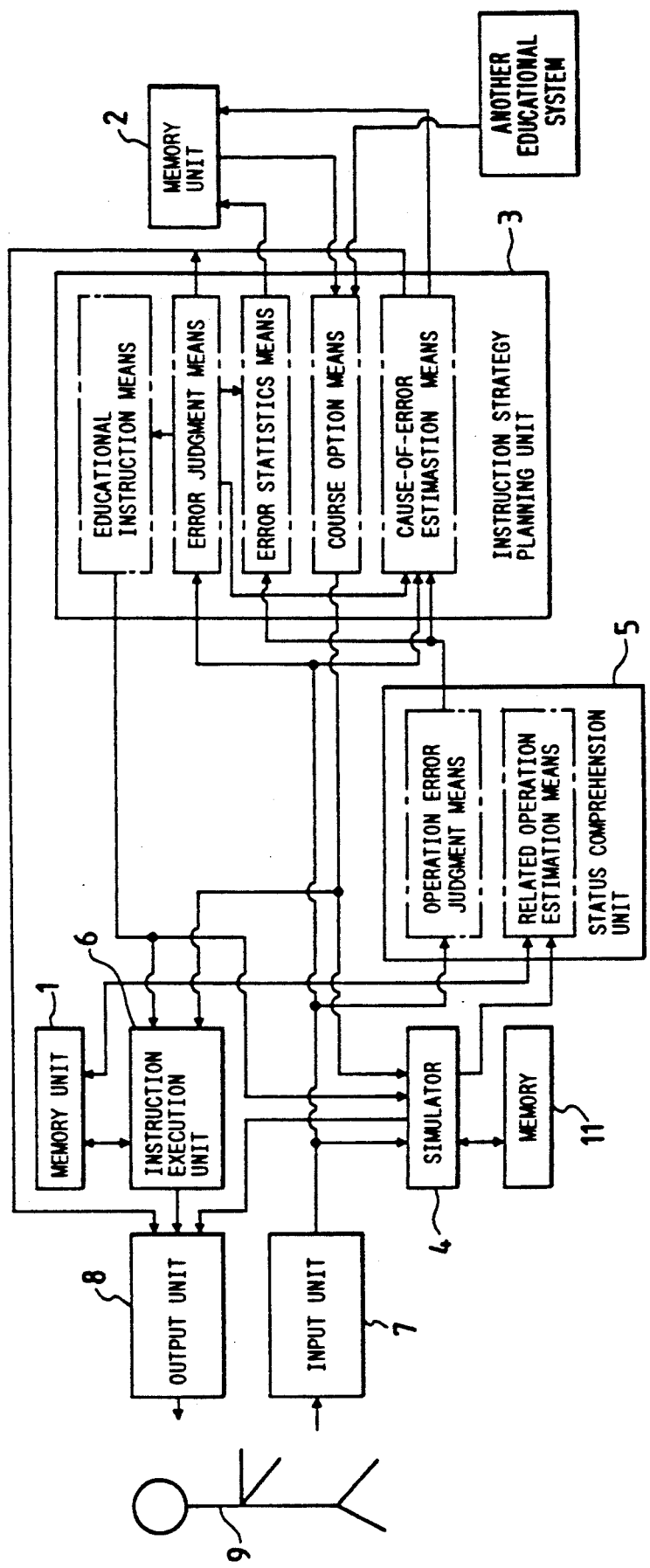
FIG. 1 is a schematic block diagram illustrating an intelligent computer assisted instruction system according to an embodiment of the present invention.

A schematic diagram of an intelligent computer assisted instruction or education system of an embodiment of the present invention is shown in FIG. 1. The intelligent education system of the invention comprises an instruction execution unit 6, an instruction strategy planning unit 3, a status comprehension unit 5, a simulator 4, a memory unit 2 for storing information regarding a learner's model, a memory unit 1 for storing knowledge regarding subject domains, an output unit 8 serving as a display unit, and an input unit 7 such as a keyboard or the like. An example of the intelligent educational system of the present invention has been developed for training operators to learn the operational procedures in a plant. For purposes of explanation, this example has been used in the following description, although the invention is to be limited only by the appended claims. In the figure, the instruction strategy planning unit 3, the status comprehension unit 5 and the instruction execution unit 6 may be incorporated in a single computer.

The memory unit 2 stores data both on an ideal learner's model and a current learner's model not at work which designates the learner's comprehension status.

Figure 2:
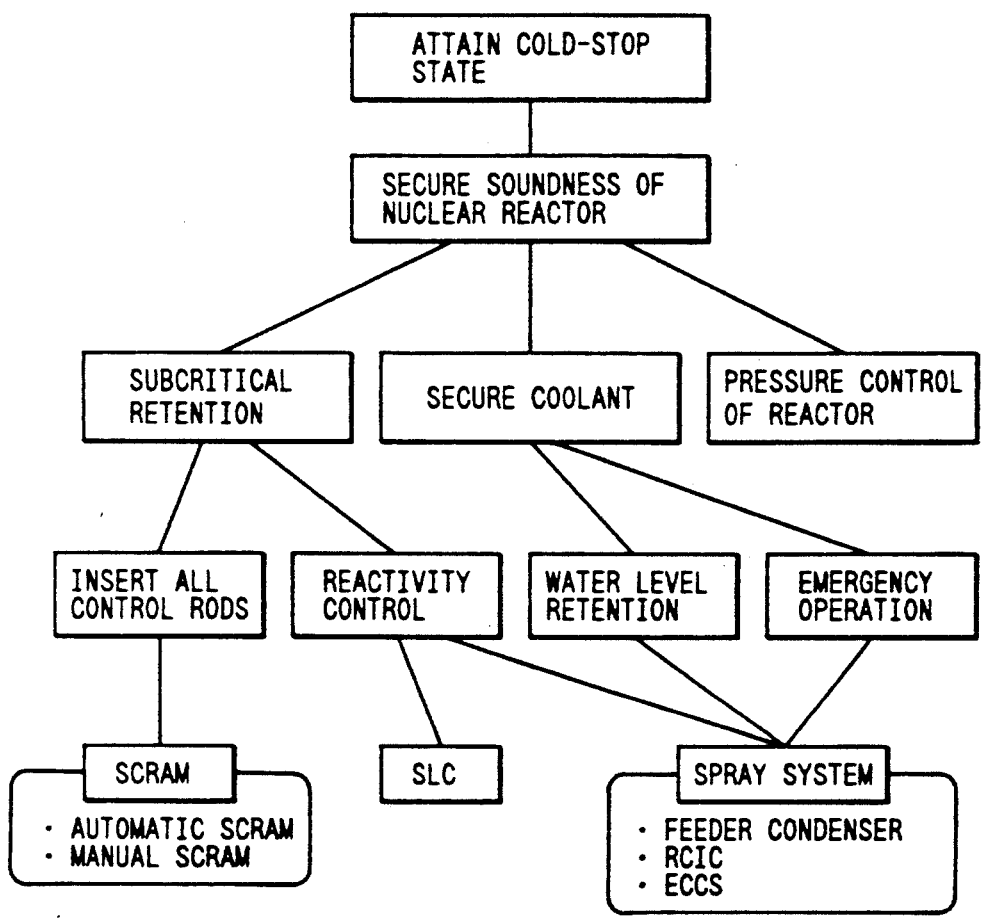
FIG. 2 illustrates a functional hierarchical model of the invention.

The ideal learner's model of the invention comprises a functional hierarchical model which is a concept model in which operation goals and their respective implementation functions in an objective plant are hierarchically arranged in order. In particular, the structure of the same is given in predetermined relationships for the functions in the functional hierarchical model with related operational procedures of relevant equipment. An example of such a functional hierarchical model embodying the invention is shown in FIG. 2. This diagram is prepared on the basis of a goal oriented concept as to which function(s) among those capable of controlling plant symptoms to be utilized or available for accomplishing a plant goal, for example, achieving a cold stop state.

The functional hierarchical model in FIG. 2 takes into account for a power plant each of the following factors in indicating mutual relationships between respective components constituting each functions.

1. In order to accomplish the plant goal of attaining a cold stop state, it is necessary to assure the soundness and reliability both of the reactor vessel and the reactor container.

2. In order to secure the soundness and reliability of the nuclear reactor, it is necessary, first to retain a subcritical state, next to secure a coolant, then to perform the pressure control of the reactor.

3. In order to retain the subcritical state, a "scram" has to be performed initially either automatically or manually. In case of a scram unavailability, a reactivity control by means of a stand-by liquid control system (SLC) or injector system should be performed.

4. While maintaining water level in a coolant injection system so as to retain sufficient coolant, in case of unexpected events such as when the water level falls below the effective length of the fuels (TAF), the water level is unknown, or a need for fast decompression arises, recovery measures should be taken through emergency operations of the water injection system or decompression system for effecting the water level recovery, water level retention at the time of unknown water level, fast decompression and so on.

5. When performing the pressure control of the nuclear reactor, decompression cooling measures are to be taken mainly through the water injection system, decompression system, residual heat removal (RHR).

6. For assuring the soundness and reliability of the reactor container, it is necessary to carry out the reactor container pressure control, reactor container temperature control, reactor container water level control, and hydrogen concentration control (for a flammable gas concentration control system (FCS)).

7. When controlling the container vessel pressure, a dry well (D/W) pressure retention method (residual heat removal system) should be utilized.

8. When controlling the container vessel temperature, a dry well temperature retention method and a suppression chamber (S/C) temperature retention method, both using the residual heat. removal system, should be utilized.

9. When controlling the water level in the container vessel, suppression chamber water level retention means (the residual heat removal system) should be employed.

In the intelligent educational system of the invention, the above-mentioned functional hierarchical model has been utilized widely for the assignment of the subject knowledge, for providing for a learner's model to indicate the degree of understanding by the learner, for displaying the state of an object and the degree of understanding by the learner, and displaying information to facilitate understanding by the learner, or the like.

The learner's model which indicates the degree of understanding by the current learner is provided through indicating information regarding the learning history and the degree of understanding which are capable of being diagnosed from the error statistics of the foregoing functional hierarchical model serving as a kernel. The methods of evaluation or assessment of the degree of understanding by the current learner will differ depending on the subject domain teaching and the simulation teaching of plant behaviors as follows.

The degree of understanding of the subject domain knowledge will be judged according to the answers to exams, responses to the questions from the system side, and questions from the learner (or examiner) 9. With respect to the understanding of the plant behaviors, this is appraised according to the learner's operations judged erroneous, responses to the questions from the system side, and questions from the learner. Further, since it is difficult to diagnose why the learner is unable to understand, or why she/he has miscomprehended, the cause is inferred through questions and answers. Updating of the learner's model stored in the memory unit 2 is executed with respect to each data on error statistics (i.e., the number of errors relative to the number of problems tried) and the contents of the errors as shown in FIG. 14.

In the following, there will be described an organic connection between the functional hierarchical model which provides basic information regarding the learner's model, and operational procedures of relevant equipment which pertain to the subject domain knowledge. An operation manual consists of a collection of respective operations guidelines. In these operations guidelines, each installation or premise condition is specified, and operations procedures for start and stop of a plant or the like are arranged in order. The operations procedures specify the sequences of operations to attain the operations guidelines, and there will be employed a particular operation guideline specified or permitted under a particular installation condition. Each operation guideline corresponds to a subgoal (attainment of a lower level function below the goal) with respect to the goal of the plant (attainment of the upper goal function). Further, the installation conditions are determined according to a loss-of-function status at lower levels. Systems described in the operations guidelines as necessary correspond to the lower functions below the subgoal. The functional hierarchical model in FIG. 2 is provided having a structure consisting of functions to be attained for the guidelines taking into account such corresponding relationships thereabove.

Figure 3:
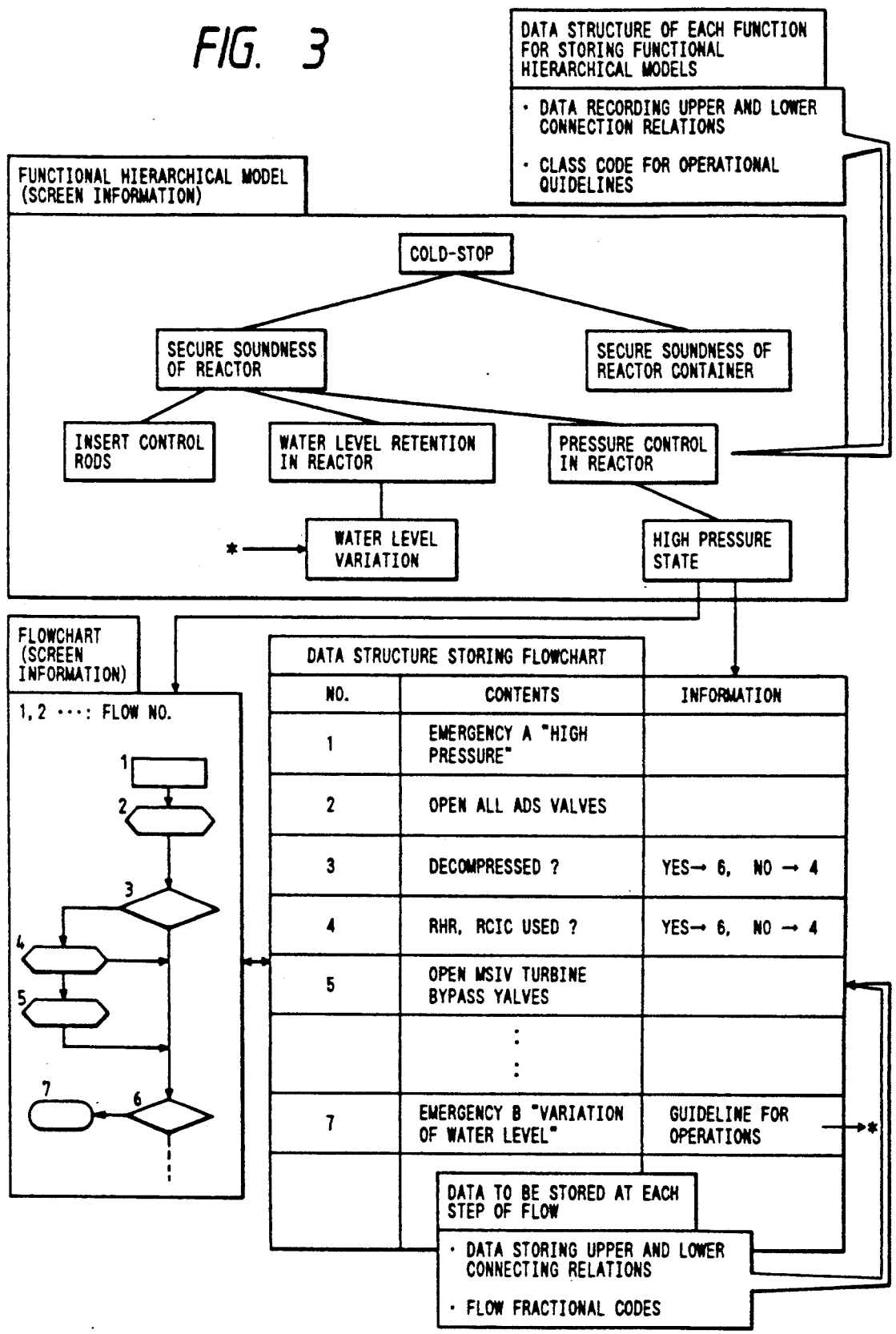
FIG. 3 explains a data structure of a subject domain knowledge stored in memory unit 1 in FIG. 1.

The subject domain knowledge stored in the memory unit 1 contains three types of knowledge; on the state of plant operations, flowcharts of corresponding operation procedures, and physical behaviors (cause-effect relationships). The learning history and the degree of understanding of such knowledge by the learner are utilized in an instruction strategy planning. The data on the learning history and understanding of the learner is contained in the foregoing learner's model (see FIG. 14). Detailed operational procedures for respective equipment are also stored in the memory unit 1 as the subject domain knowledge. This embodiment of the invention is arranged so that which function the functional hierarchical model is to be utilized is judged under a given installation condition, and that a pertinent operation guideline corresponding to each function is retrieved accordingly. An example of the data structures of the subject domain knowledge to be employed in this embodiment of the invention is shown in FIG. 3.

This data structure comprises display information to be displayed on the screen (such as on the functional hierarchical model, flowcharts and the like), and information necessary for the systems to recognize the contents (such as data on the flowcharts in memory). Data which indicates a corresponding relationship between each component constituting functions in the data structure and each relevant procedure in the operation manual will be applied in formulating display menus for questions and answers to be described later, and in the treatment of error statistics of the learner.

Figure 4:
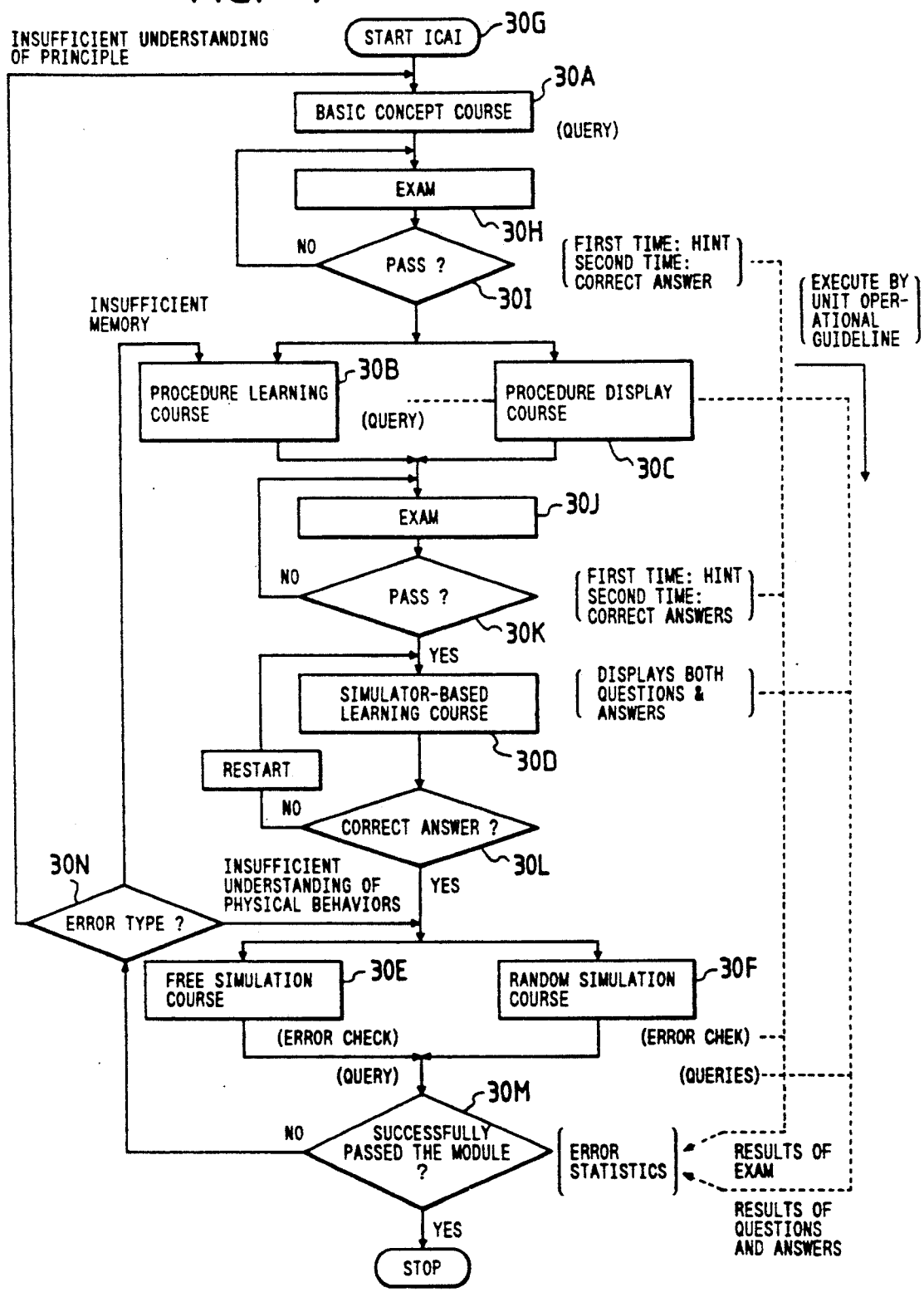
FIG. 4 shows sequences of instructions to be executed by instruction strategy planning unit 3 of FIG. 1.

The instruction strategy planning unit 3 comprises: educational instruction means for instructing and executing a curriculum of each intelligent computer assisted instruction course shown in FIG. 4 (except for steps 30M and 30N in FIG. 4); error judgement means for judging errors made by the learner; error statistic means for taking statistics of the errors by he learner; cause-of-error estimation means for inferring the cause of errors made by the learner; and course option means for choosing an optimum teaching course suitable for the learner corresponding to the degree of understanding of the learner 9. FIG. 4 illustrates an outline of the learning procedures assigned to the learner 9. These learning procedures are readily capable of being modified according to the learner's learning history and the progress of understanding. The contents of teaching in FIG. 4 focus on the training of plant operations, and are grouped roughly into the following three categories. In principle, however, the contents of teaching are divided into two; one, subject domain learning, the other, learning of the behavior patterns of an operation object, for instance, of a plant. The following (a) and (b) pertain to the subject domain learning, while (c) pertains to the behavior pattern learning. In FIG. 4 are included the following instruction courses; a basic conceptual course 30A, an operational procedure learning course 30B, an operational procedure display course 30C, a simulator-based learning course 30D, a free simulation course 30E and a random simulation course 30F.

(a) Concept learning; basic conceptual course 30A.

This course assists the learner 9 in comprehending the following two concepts before starting the operation procedure learning:

i) a policy for formulating operations procedures
ii) plant operations goal setting (b) Subject learning of the operations procedures Operations procedures for a plant are taught to the learner via the following two courses.

i) Operations procedure learning course 30B

The procedures and sequences of operations are displayed on the output unit 8, together with associated questions to facilitate understanding of the operations by the learner 9.

ii) Operations procedure display course 30C

For the convenience of the learner 9, steps of the procedures of operations are displayed.

(c) Simulator-based plant behavior comprehension learning

The following three courses using a simulator help the learner 9 to understand corresponding relationships between the operations procedures and a resulting phenomena arising in the plant. Further, these courses diagnose erroneous operations by the learner, thus facilitating learning of correct operations in correlation with the plant states.

i) Simulator-based learning course 30D

A predetermined scenario plant operation is simulated, and at each breakpoint requiring operational steps to be taken, a query to the learner is displayed on the output unit 8. When an answer to the query by the learner is incorrect, plant states both for the correct answer and the wrong answer are displayed thereon. At the next breakpoint, the simulator restarts from a default state of the correct answer, thus allowing the learner 9 to understand the basic operation procedures corresponding to the plant status.

ii) Free Simulation Course 30E

Under an optional scenario of plant operations selected by the learner 9, free operations at free timing can be executed. Plant conditions under such circumstances are capable of being learned through free simulations. The term "free" simulation means that the learner knows what the situation is that he/she is presented with and is expected to respond to.

iii) Random Simulation Course 30F

Without informing the learner 9 of a predetermined scenario of plant operation, a simulation is executed, and related queries concerning the operation procedures are displayed. This is in contrast to the free simulation in which the learner is aware of the simulation scenario. Since the learner has to cope with a situation where any event may occur in the plant in performing operational procedures, overall competence of the learner may be appreciated.

For both ii) and iii) courses, an error check of operations made by the learner 9 is executed by operation error judgement means 5 to be described later. Then, the operation error judgment means transmits the result of judgment to the simulator 4. The simulator 4 outputs pertinent advice to the learner 9 to be displayed in the output unit 8 corresponding to the results of judgment of simulations performed for each operation in the plant. At once, the learner is capable of knowing the result of his/her operation, and, if misoperated, where to pay more attention in future follow-up study.

The instruction execution unit 6 reads out information on the subject domain knowledge relative to the curriculum of the instruction course specified by the education instruction means and the course option means in the instruction strategy planning unit 3, from the memory unit 1 to be displayed on the output unit 8. Namely, when the instruction course specified by the instruction strategy planning unit 3 is the basic conceptual course 30A, the operational procedure learning course 30B or the operational procedure display course 30C, the instruction execution unit 6 outputs the above information to the output unit 8.

Information pertaining to the response entered via the input unit 7 by the learner 9 in response to the questions or the like displayed on the output unit 8 during the course of the related education via the instruction execution unit 6 and the simulator 4 to be described later, will also be entered into the instruction strategy planning unit 3. The error judgment means in the instruction strategy planning unit 3 extracts errors in the response. The instruction strategy planning unit 3, however, does not check the operations conducted by the learner 9 for the simulations executed by the simulator 4.

The simulator 4 is one which simulates the characteristics of a plant. The simulator 4 is provided with memory 11 storing a set of programs necessary for executing respective simulations for the simulator-based learning course 30D, free simulation course 30E and random simulation course 30F, and information necessary for executing each course of teaching. When the instruction course specified by the instruction strategy planning unit 3 is one of the simulator-based learnin9 course 30D, free simulation course 30E and random simulation course 30F, the simulator 4 executes a program for a related simulation, and provides information obtained through the simulation and related information read out from the above memory to the output unit 8.

Information regarding plant operations entered from the input unit 7 by the learner 9 during the course of learning using the simulator 4, is entered into the simulator 4. According to the information regarding plant operations, the simulator 4 executes simulation, and provides information obtained through the simulation to the output unit 8 and to the related operation estimation means in the status comprehension or cognizance unit 5. The output unit 8 displays information obtained through simulation.

The status comprehension (monitor) unit 5 contains corresponding operation judgment means and operation error judgment means. The corresponding operation judgment means estimates correspondence between the information obtained through simulation via the simulator 4 and the specified operation procedures for a given instruction course retrieved from the memory unit 1. When the learner 9 has done a correct corresponding operation, the corresponding operation judgment means is easily able to perform estimation of its correspondence. However, when the learner 9 has done an incorrect operation, it is necessary to estimate correspondence or correlate between the operations done by the learner and the prescribed operation procedures, always confirming an installation condition for any particular operation procedure to be taken, and monitoring a possible shift to another operational guideline. The abovementioned corresponding operation estimation means is provided with such functions. The operation error judgment means performs its error judgment regarding the operations done by the learner 9 in such a manner that it judges whether the information obtained through simulation with respect to a particular corresponding portion estimated by the corresponding operation judgment means differs from the result of the above described operation procedure. The result of the error judgment is entered into the error statistics means in the instruction strategy planning unit 3.

Policy-making with respect to the education according to the present invention, involves two categories of strategies; a global instruction strategy which determines which of the education courses in the reign of the instruction strategy planning unit 3 is to be executed, and a local instruction strategy which determines what education is to be executed within a scope of the specified educational courses in the reign of the simulator 4 and the educational execution unit 6. This instruction strategy must be planned for each operation guideline. The preferred embodiment of the invention, in principle, requires all of the operation guidelines to be learned. In view of such, for every operation guideline, data on the learner's model stored in the memory unit 2 is checked, and on the basis of the result of such judgment, the instruction strategy is updated as follows. Namely, the subject learning (courses 30A, 30B and 30C) executed by the instruction execution unit 6 is of a type of the intelligent computer assisted instruction (tutor) method for teaching subject domain knowledge regarding the concept of the operation guidelines and the prescribed operations procedures. In the course of this subject domain learning, the learner takes an exam which demands responses to very fundamental problems, and is encouraged until she/he gets full marks. Some examples of the exam are shown in FIG. 6B. Another plant behavior comprehension learning (courses 30D, 30E and 30F) is of an experimental environment type education method. In the course of the plant behavior comprehension learning, simulation is performed within the scope of assimilated plant operation, and a comparison between the operations don by the learner 9 and the correct operations is displayed (trend displays of the prescribed correct operations to be described later, and of those done by the learner) for facilitating the learner's understanding, with pieces of advice being given.

In order to inform the learner of the progress of the learning, the education already executed and the learner's achievements (see FIG. 15) are displayed on the output unit 8 every time the intelligent computer assisted instruction system of the invention starts and stops. By such an arrangement, the learner is capable of knowing what part she/he should learn more attentively or exhaustively in the future follow-up lessons.

Figure 5:
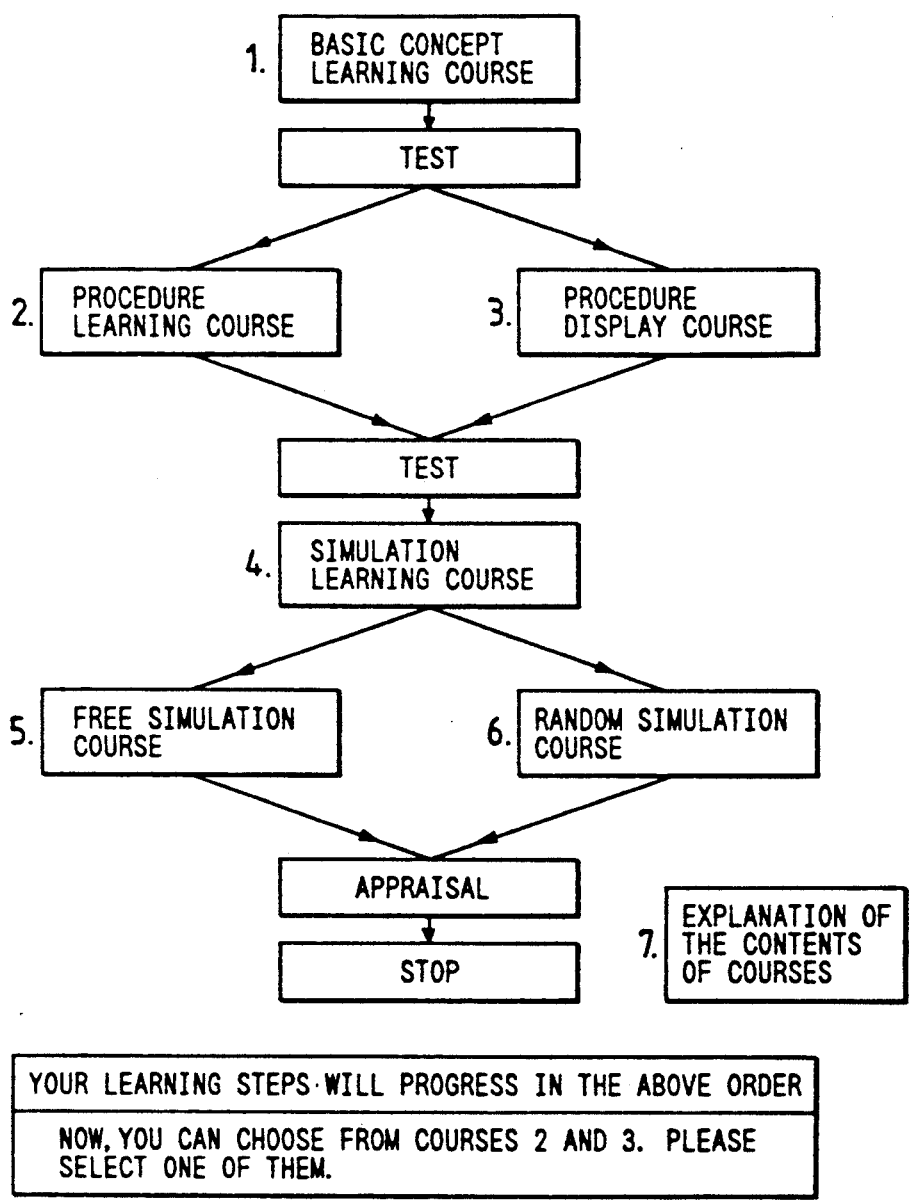
FIG. 5 shows an example of a display screen displaying the contents of an instruction course to be executed through the embodiment of FIG. 1.

An education method of plant operations according to the present invention will be set forth in the following. When the learner 9 starts up a system embodying the invention, education instruction means in the instruction strategy planning unit 3 executes processing of steps from 30G to 30E (or 30F) shown in FIG. 4. In the first, step 30G is executed. Namely, education instruction means in the instruction strategy planning unit 3 puts out a signal "to start Intelligent Computer Assisted Instruction (ICAI)" to the instruction execution unit 6. the instruction execution unit 6 reads out information as shown in FIG. 5 from the memory unit 1, then provides the information to the output unit 8. The learner 9 is capable of knowing the contents of education and its procedures from the information of FIG. 5 displayed on the output unit 8. The learner 9 selects optional courses from those displayed; choosing either of courses "2" or "3", and also either of courses "5" or "6". Normally, however, a series of respective courses from course 1 (course 30A) to course 5 or 6 (30E or 30F) are executed. According to the performance by the learner 9 in the past education of the present invention, however, part of these courses need not be compulsory, but may be optional. Such past performance (achievement) data is stored in the memory unit 2 as learner's model data. Optional courses chosen are displayed in different colors for respective course names in FIG. 5. Suppose that in the following the learner 9 has chosen courses "2" and "6", thus being entered through the input unit 7.

Then, the education instruction means instructs the instruction execution unit 6 to execute a curriculum of a basic concept course 30A. The instruction execution unit 6 retrieves educational information necessary for the curriculum and related information from memory unit 1, and provides the same to output unit 8 to be displayed in sequence thereon. Viewing the contents of the information thus displayed, the learner continues learning the basic concept course 30A. Referring to a functional hierarchical model as shown in FIG. 2, the learner 9 perceives operation guidelines in their respective levels and positions. Information as shown in FIG. 3 helps the learner to learn how to build a goal for plant operation (to provide a goal oriented training) and to grasp a relationship between the goal and installation conditions for a specific operation guideline.

In the course of the curriculum of the basic concept learning course 30A, questions concerning the contents of education are displayed on the screen of the output unit 8. These questions displayed are called up from the memory unit 1 by the instruction execution unit 6. Responses by the learner 9 to these questions are entered via the input unit 7 to error judgment means in the instruction strategy planning unit 3. After completing the lesson for the course 30A, the instruction execution unit 6 selectively displays contents of the exam for the course 30A retrieved from the memory unit 1 on the output unit 8, in accordance with the execution of step 30H by the education instruction means. The responses to the exam are also entered via the input unit 7 by the learner 9 and are transmitted to the error judgment means in the education strategy planning unit 3. The education instruction means to which is entered the result of judgment from the error judgment means, makes a pass/failure judgment based on the responses (step 30I). In case of a failure, the exam is repeated until full marks are obtained. Error statistics means enters the result of judgment by the error judgment means to obtain error statistics, and provides the same to the memory unit 2 to update the error statistical data of the learner's model.

When the judgment at step 30I indicates "pass" or full marks, the operation procedure learning course 30B is executed by the instruction execution unit 6 complying with the instructions from the education instruction means as with the course 30A. Also, in this learning course, information in FIG. 2 is displayed on the output unit 8, indicating operation guidelines capable of being chosen (the relationship between the operation guidelines and the installation conditions being arranged and corresponded beforehand). In addition, a flowchart indicating operation procedures is displayed, and its detailed sequence of operations is announced audibly. Similarly, the course 30A questions are displayed. The exam at step 30J and pass/failure judgment at step 30K are done also for the course 30A. Information regarding questions and exams for the courses 30B and 30C is stored in the memory unit 1. Some examples of an exam to be conducted according to an instruction at step 30J are shown in FIG. 6, and are displayed on the screen of the output unit 8. This exam includes important contents essential in the lesson of the course 30B.

Figure 7B:
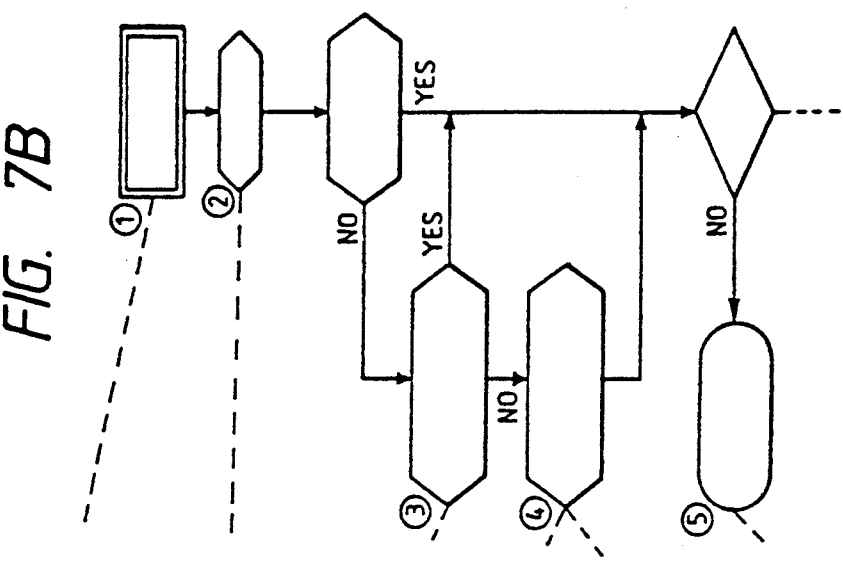
FIG. 7B illustrates a flow chart of operation procedures corresponding to the menus of FIG. 7A.
Figure 7A:
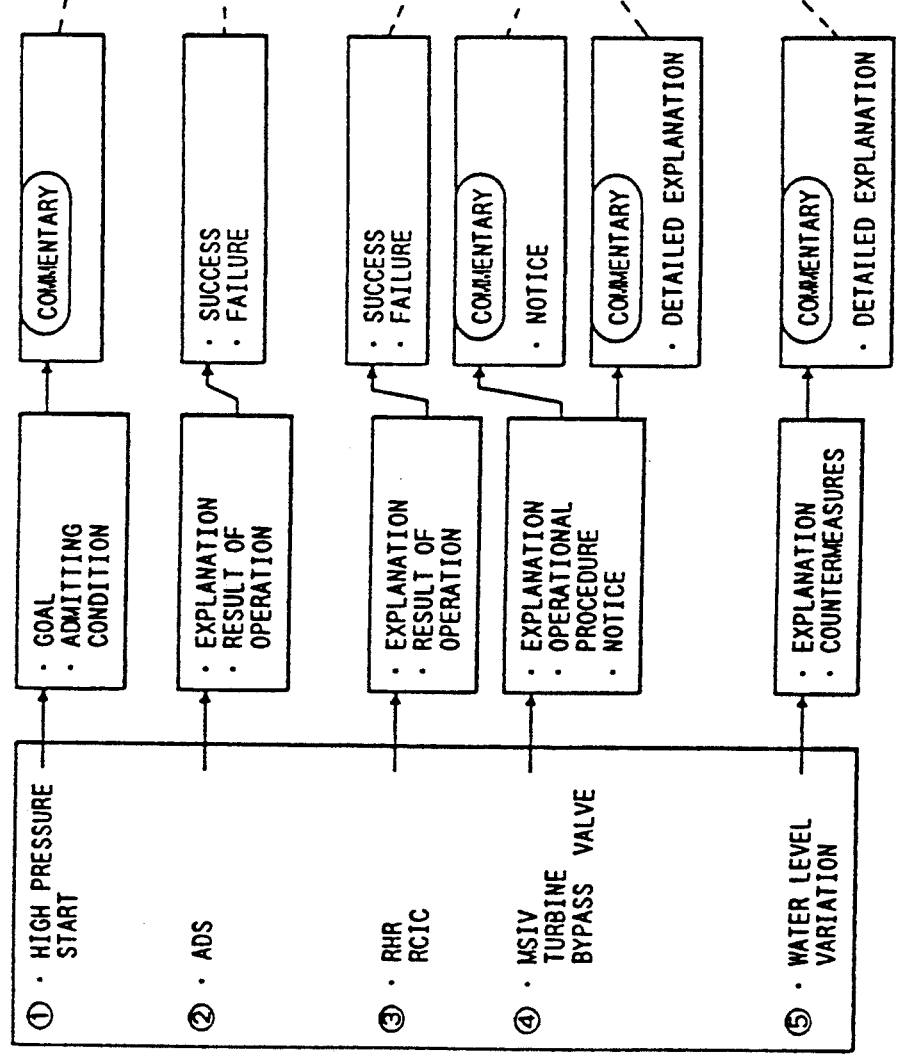
FIG. 7A illustrates menus of questions a learner enters.

During the course 30B, the learner is capable of asking questions to the intelligent computer assisted instruction system, which is also possible with the course 30A. Menus of questions the learner enters comprise such menus as shown in FIG. 7A, each corresponding to respective operation procedures in the flowchart. Such menu information is retrieved from the memory unit 1 to be displayed on the output unit 8. Since this question menu is always displayed in the menu region in the output unit 8, and updated in accordance with the progress of the learning, the learner is capable of asking any question at any time. Further, the contents of a menu which constitute elements of the operation procedure selected in FIG. 7B are given according to the kinds of respective elements constituting the flowchart in flow classification codes in FIG. 3. The output unit 8 employs a multiwindow method, thereby, question menus are displayed in one window. In addition to such questions, there may be added a learning history of the learner, i.e., the learner's model as data, or a question menu corresponding to the degree of understanding of the above questions.

Question menus to be added are retrieved from memory unit 1 by the instruction execution unit 6 in accordance with the degree of understanding of the questions. Thereby, the learner is capable of asking questions to the system according to the degree of his/her understanding.

In this embodiment of the invention, the error statistical means in the instruction strategy planning unit 3 measures statistics of errors as set forth previously, in order to comprehend the degree of understanding by the learner who has received the training. Error cause estimation means in the instruction strategy planning unit 3 enters the result of judgment by the error judgment means of the unit, to estimate the cause of incorrect responses from the learner.

Figure 8:
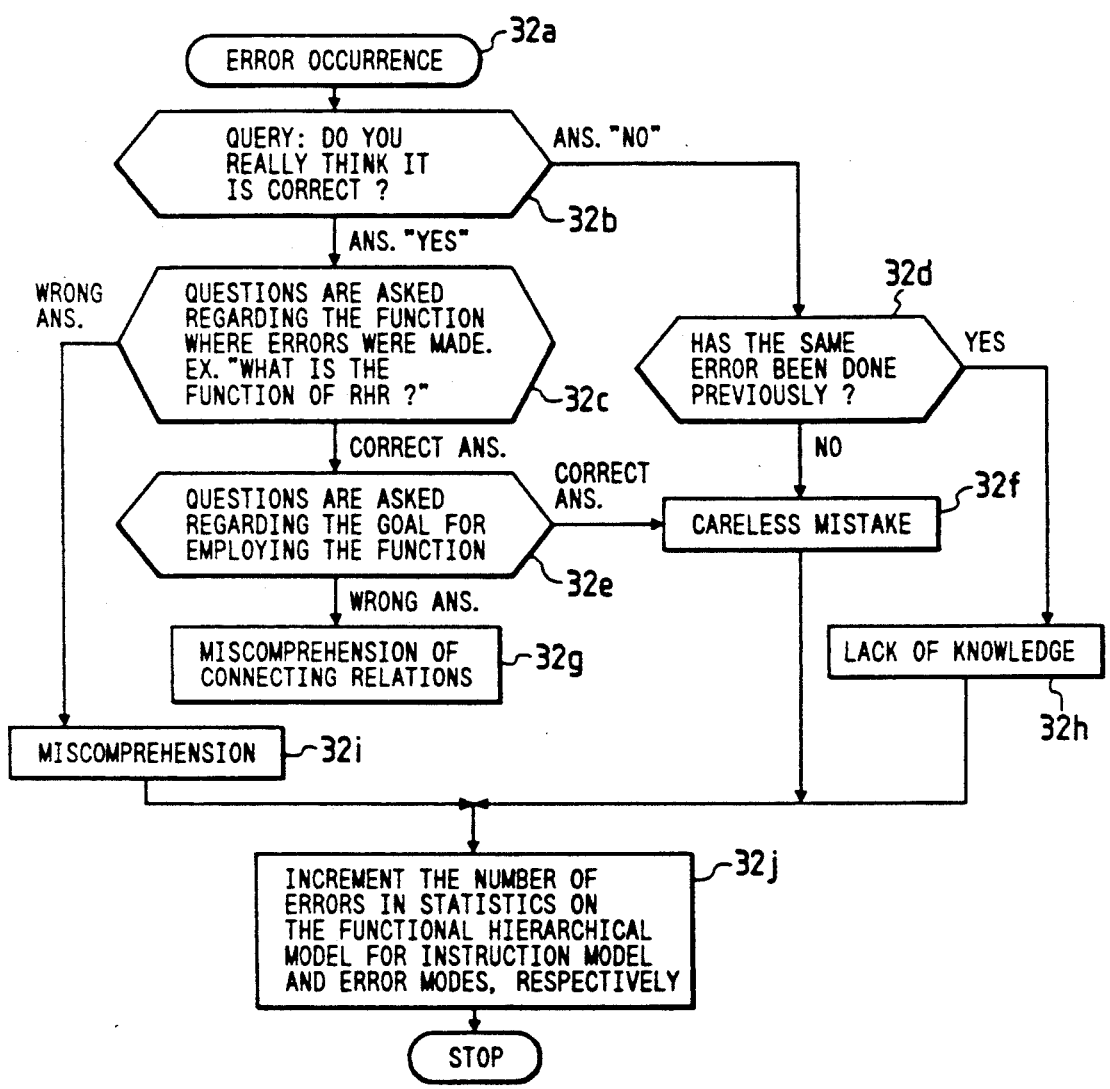
FIG. 8 illustrates process sequences for estimating errors made by the learner in the course of the subject learning.

Sequences of a process for asking questions to estimate causes of errors, if any, are shown in FIG. 8. The sequences of the process are executed by the error cause estimation means in the instruction strategy planning unit 3, in particular, in the courses 30A, 30B and 30C. The contents of the questions are displayed on the output unit 8, and the responses to the questions are entered via the input unit 7 by the learner.

First, at step 32a, it is judged whether an error(s) is included in the response from the learner entered via the input unit 7. When no error is included, processing at step 32a is repeated within a short preset period of time. When any error is included, a question is asked "Do you really think it is correct?" (Step 32b). When the answer of the learner to the question was "No", it is judged whether the same error has been committed previously (step 32d). When the same error has been committed, it is judged due to "the lack of knowledge" of the learner (step 32h). When the same error as the above has not been done, it is judged due to carelessness (step 32f). Further, when the learner answered "Yes" to the question at step 32b, a question(s) is asked with respect to the function about which the learner has made an error (step 32c). When the learner erroneously responds to the question, it is judged as "miscomprehension" (step 32i). When the learner responds correctly to the question at step 32c, further questions are asked with respect to the object for using the function (step 32e). When the learner answers correctly to the questions at step 32e, it is judged as a careless mistake (step 32f), and when the learner answers erroneously to the questions at step 32e, it is judged as "miscomprehension in the connection relationships of the functions" (step 32g). When a judgment is made as falling in the categories of steps 32f, 32h, or 32i, the number of errors in the error statistics of the learner is incremented for respective modules in the corresponding instruction course, and at the same time the data on the judgment (the contents of the judgment) is output to the memory unit 2 to be stored in an entry of "error contents", which is the same with the process sequences in FIGS. 12 and 13.

Through execution of the above process sequences, causes of the error(s) made by the learner, and the degree of understanding by the learner of the instructions being taught are capable of being obtained precisely. Further, by displaying the result of the judgment for steps 32f, 32h and 32i on the output unit 8, the learner is also capable of comprehending the degree of his/her understanding, which will be helpful in his/her future learning.

The aforementioned respective modules constitute each element which contains operational guidelines and the like which constitute a functional hierarchical model. The module in the functional hierarchical model correspond to each block indicated by solid lines (each corresponding to a solid line frame in FIG. 2 representing operations such as "subcritical retention", "water level retention" or the like) in a dotted line frame in the upper portion of FIG. 14. As an example, "decompression cooling" is shown in FIG. 14. The modules in the embodiment of the invention correspond to respective operational guidelines such as "subcritical retention", "water level retention", "decompression cooling" or the like, each containing operational sequences relative to the operational guidelines. Execution of curriculums for respective modules is done at each instruction (teaching) course according to the embodiment of the invention, i.e., at the courses 30A, 30B, 30C, 30D, 30E and 30F. Each of these modules constitutes a unit of education within a particular education course. In other words, one instruction course comprises a plurality of educational units having different contents of curriculums.

Figures 9, 10:
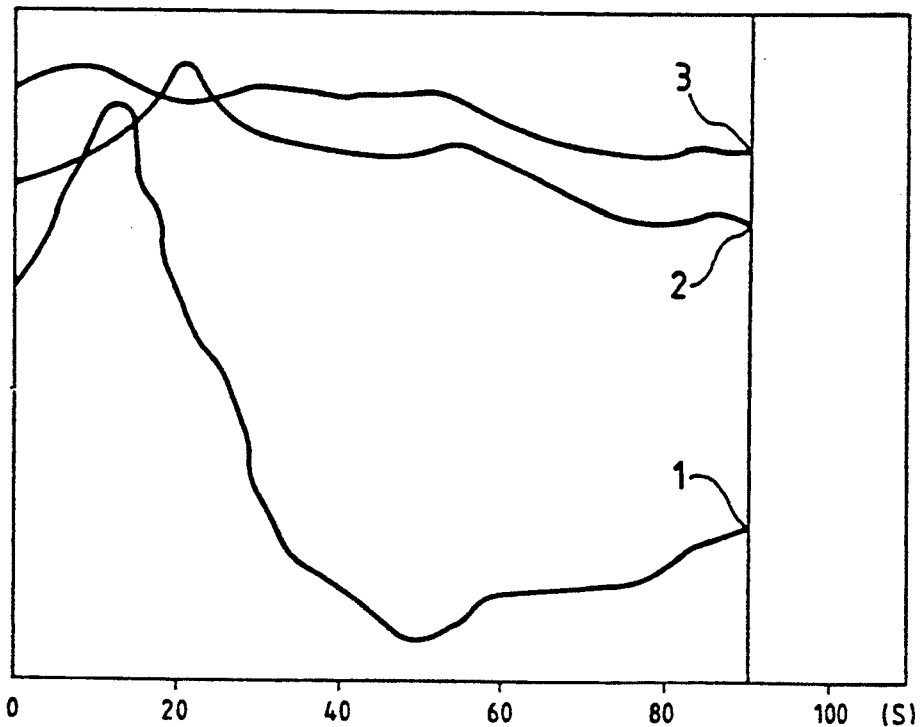
FIG. 9 illustrates an example of menu screens of a simulation to be executed by simulator 4.
FIG. 10 shows a displayed part of the results of simulation executed in the simulator 4.

When a judgment at step 30K is "pass", education of the simulator-based learning course 30D is executed using simulator 4. The simulator 4 retrieves a menu as shown in FIG. 9 from the memory to be displayed on the output unit 8 before initiating the course 30D education. This menu indicates respective simulation cases in corresponding education courses. Thereby, the learner chooses an optional case (scenario no.), and enters the number via input unit 7. This menu will be displayed on the output unit 8 at the times of starting a free simulation course 30E, and of completing a random simulation course 30F. In the random simulation course 30F, a simulation case selected for the education will be displayed. Simulation cases shown in the menu of FIG. 9 reflect the contents to be taught at each course of subject learning, except for subject items not be learned in such courses. The simulator 4 executes a simulation of the scenario number specified by the learner 9, and displays the result obtained thereby on the output unit 8. FIG. 10 illustrates examples of the results thus obtained, indicating trends of major parameters in simulation cases. Displaying on the output unit 8 the trends of FIG. 10 in combination with information regarding a plant status with respect to an object portion on the functional hierarchical model in FIG. 2, will enable the learner to comprehend the changes in the major parameters and corresponding plant status concurrently. As set forth previously, in these education courses, a question is asked to the learner at every breakpoint where an operation is required to be taken during the execution of a simulation. The learner 9 enters his/her response to the question via the input unit 7. Restart of the simulation for the next breakpoint is done only when the response to the question is correct. Thus, every response is judged whether it is correct or not (step 30 L in FIG. 4).

When the judgment at step 30L is "Yes", a curriculum of a random simulation course 30F for the final instruction course is executed. In this course, the information regarding the operations the learner has done is entered via the input unit 7, and a simulation reflecting the information is executed by the simulator 4. Then, the simulator 4 causes the output unit 8 to display the result of simulation (for instance, such as FIG. 10). When an erroneous operation is done, a simulation as it is, i.e., in an erroneous state is performed. In this case, however, both trends of the results of simulation for the erroneous operation and for a preset operational procedure contained in the subject knowledge are displayed on the output unit 8. The trends for the latter are stored as data in the memory of the simulator 4 in advance. Corresponding to the progress of simulation, the corresponding portion in the relevant trend data is retrieved from the memory by the simulator 4 to be displayed on the output unite 8. Displaying both the trends including that due to the erroneous operation as above on the output unit 8 is very important in enabling the learner to have a deep understanding of the significance of his/her erroneous operation. Namely, the learner is capable of improving his/her competence for plant operation status judgment by referring to these trend displays. Further, in the random simulation course 30F, questions are also displayed as in the course 30D. The learner's response to such questions entered via input unit 7 is transmitted to the error judgment means in the instruction strategy planning unit 3.

The course selection means in the instruction strategy planning unit 3 makes a judgment (appraisal) of pass or failure in FIG. 4 (step 30M) on the basis of the data for the error statistics included in the learner's model in the memory unit 2. Appraisal of pass or failure is made with respect to each module in respective instruction courses. The learner's model stored in the memory unit 2 contains each data of "the number of experiences", "the number of errors per the number of questioned answered" and "the contents of errors" for respective "basic concept education", "procedure education" and "simulator-based education" shown in FIG. 14B with respect to each module. These sets of data are obtained for each module through the abovementioned corresponding means, and are stored in the learner's model. "The basic concept education" involves data in the course 30A, "the procedure education" involves data of the courses 30 B and 30C, while "simulation education" involves data for the courses 30D, 30E and 30F.

In such a module where "Yes" is given for a judgment at step 30M, it is considered whether the contents of a provided curriculum has been mastered by the learner, thus completing the education. In every module where a judgment of "No" is given at step 30M, a judgment shown at step 30N is given. The step 30N makes a judgment as to which instruction course(s) are to be further studied, according to the degrees of understanding by the learner 9 of respective modules which are the objects of judgment in this step, or in other words, according to the type of education the learner tends to make more mistakes with respect to the same modules ("basic concept education", "procedure education" or "simulation education"). When an error type for a certain module is found to be "due to the lack of basic knowledge", i.e., when a data in the error statistics regarding "basic concept education" for the module is larger than a preset value, re-education for the same module is executed at course 30A. When a error type for a certain module in the above is judged as due to "insufficient (vague) memory", i.e., when a data in the error statistics regarding "procedure education" for the module is larger than a preset value, reeducation of the courses 30B and 30D is executed. During such reeducation, course 30D may be omitted if the learner chooses so. When an error type for a certain module in the above is found to be due to "insufficient understanding of the physical behaviors", i.e., when a data in the error statistics regarding "simulator education" for the module is larger than a preset value, reeducation of courses 30E or 30F is executed. For such a learner who has made several types of errors, it is indispensable to be reeducated in each module of the instruction courses corresponding to the respective error types which have been made. Instruction courses other than these may be chosen optionally by the learner. The above criteria for judgment at step 30N is only an example, thus a course further to be learned in the future may be determined according to the contents of errors in the learner's model.

The course selection means gives an instruction to the instruction execution unit 6 and simulator 4 regarding an instruction course and modules therein to be reeducated on the basis of the judgment at step 30N. If the instruction is concerned with subject learning, the instruction execution unit 6 retrieves information regarding a curriculum of a corresponding module from the memory unit 1 according to the instruction, and displays the same on the output unit 8. If the instruction is concerned with the behavior comprehension learning through simulation, the simulator 4 executes simulation of the module including its scenario in a corresponding course. Reeducation through the educational execution unit 6 or simulator 4 is completed when reeducation for every module designated by the course selection means is completed.

In order to obtain the above error statistics via the error statistics means in the instruction strategy planning unit 3, not only the data regarding error judgment in the subject learning, but also the data regarding the error judgment with respect to the operations done by the learner are needed. This error judgment is done by the operation error judgment means of the status comprehension unit 5. To assist judgment by the operation error judgment means, corresponding operation judgment means in the status comprehension unit 5, in the first instance, judges as to which portion of what task the result of simulation entered from the simulator 4 corresponds to, based on the knowledge regarding event changes (transitions) in a plant with respect to operation guidelines. For instance, the knowledge regarding an event transition is expressed in a frame format. Using this event transition knowledge and production rules of an if-then type, the corresponding operation judgment means infers an emerging event resulting from a current simulation through reasoning about plant events in transition under simulation. Then, based on the event thus inferred, the corresponding operation judgment means estimates a correct operation to be followed with respect to the simulation under way in the simulator 4. Namely, the corresponding operation means retrieves information as shown in FIG. 11 regarding corresponding to pertinent operations for the plant, based on the inferred event. Then, the corresponding operation judgment units presumes the operation as a correct one which is indicated by a facet value in a then clause which is one of the slots for the retrieved knowledge. The operation error check (judgment) means enters the correct operation obtained through the corresponding operation judgment means, makes a comparison between this correct operation and an actual operation done by the learner, and checks operation errors done by the learner. Knowledge regarding event transitions, knowledge regarding corresponding operations, and the above production rules are stored in the memory unit 1. In an example of knowledge as shown in FIG. 11, a frame name has an if clause, and a then clause is included as one of the slots. The exemplary knowledge contains "effect" in its slots which contains data regarding "the effects caused by operations". Thereby, according to the values of facets contained in the slots, the significance of erroneous operations by the learner is capable of being judged. The results of the judgment regarding misoperations obtained by the operation error judgment means of the status comprehension unit 5 are transferred to the error judgment means and the error cause estimation means in the instruction strategy planning unit 3.

In planning an instruction strategy in the instruction strategy planning unit 3, it becomes necessary to comprehend the degree of understanding by the learner of lessons in various situations. As one of the means for judging the degree of understanding, there is a method based on error statistics. In the example embodying the invention, this method has been utilized for judging the degree of a learner's understanding.

Figure 14A:
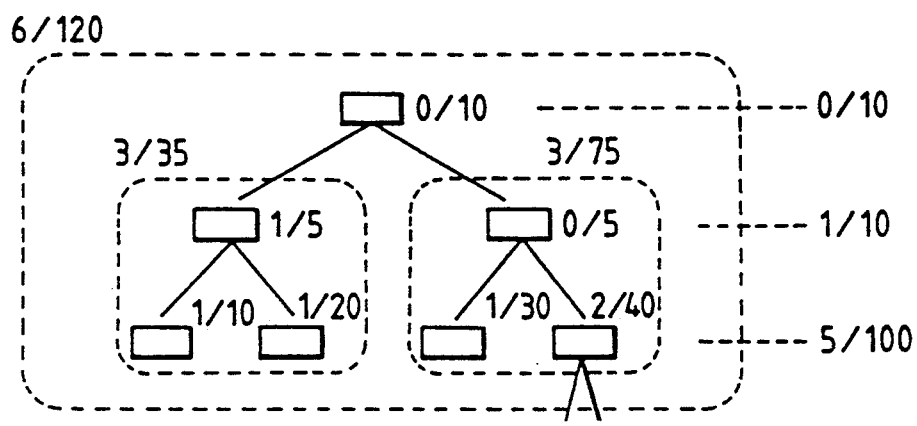
FIG. 14A illustrates some data on error statistics.
Figure 14B:
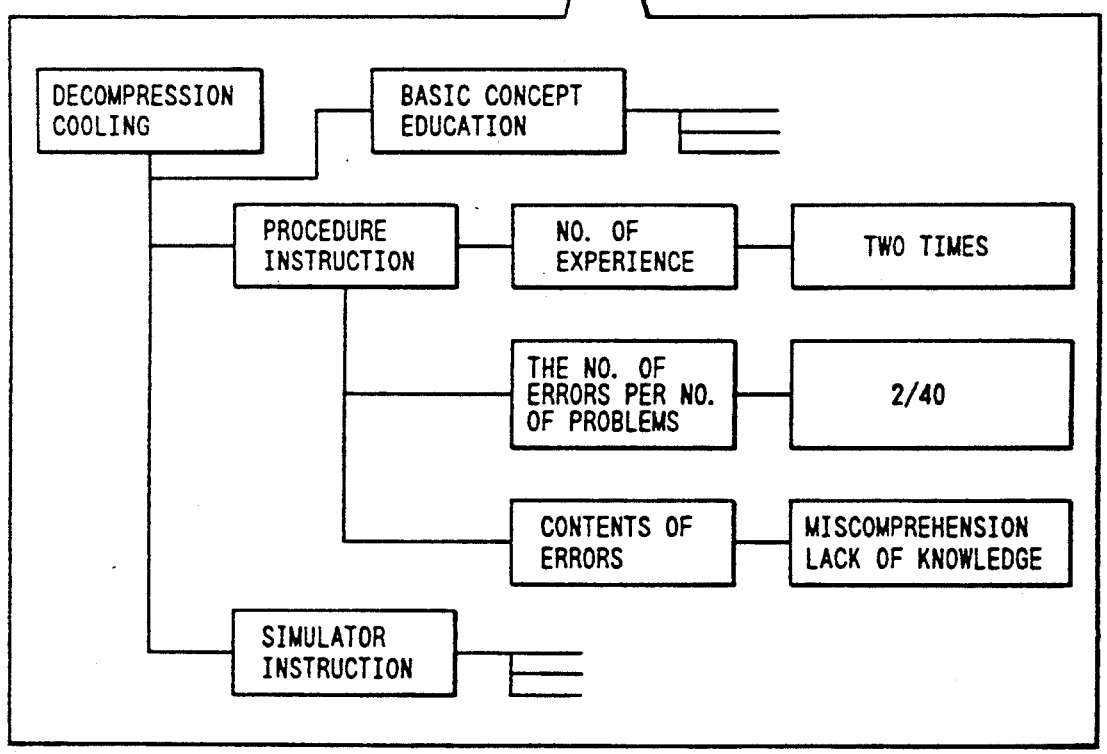
FIG. 14B shows data contained in the learner's model stored in the memory unit.

In order to take error statistics, the error statistical means in the instruction strategy planning unit 3 enters all of the whole data on errors obtained through the error judgment means in the instruction strategy planning unit 3 and the status comprehension unit 5, respectively. As shown in FIG. 14A and 14B, the error statistical means takes statistics on the number of errors (numerator) per the number of trials (denominator) for each one of the components, sets and levels of the components that constitutes the functional hierarchical model in FIG. 2. The number of trials refers to the number of times the same question is asked and the same problem in the exam is repeated. The information containing data on the error statistics, learning history of the learner (twice in this example) and the learning status (e.g., two errors in forty trials, the contents of errors; miscomprehension and lack of knowledge) is added to the data of the above functional hierarchical model to be stored in the memory unit 2 as a learner's model. According to the error statistics, it is possible to judge as to what domain, i.e., in what function(s) or level(s) the learner lacks knowledge. In the random simulation course, the system side chooses events in such a manner that the highest level in the whole module (which corresponds to a score of 6/120) may become significant in terms of statistics upon completion of the curriculum for the intelligent computer assisted instruction system embodying the invention.

Further, in order to know the degree of understanding by the learner concretely, it is necessary to infer the cause of the errors made by the learner. Displaying the inferred cause of the errors will encourage the learner to take up a follow-up learning, and in addition, will be helpful in planning a more pertinent instruction strategy for the learner. Thereby, in order to estimate the cause of errors, the system side of the invention asks questions to the learner concerning timing of operations, knowledge about subject domains and so on. For instance, for judgment as to an omission error or a timing error, a question is asked "When do you think is the best timing for such and such operations?". Thereby, it is possible to judge whether the error is due to the negligence in the operational procedure (misunderstanding the operational procedures) or erroneous timing (misunderstanding the physical behavior). With respect to the omission errors, for example, the following questions are asked step by step to determine the contents of understanding the learner so that the precision of the learner's model may be improved. The error information thus obtained is transmitted from the strategy planning unit 3 to the memory unit 2 to be used for updating the data of the learner's model.

| |
|---|
| "What is the aim of this operational guideline?" |
| Understanding of the concept |
| "For what objective have you done this operation?" |
| Understanding of operational procedures |
| "What function(s) does this system provide?" |
| Understanding of physical behaviors. |

In accordance with the degree of understanding (error statistics data), a feedback is given corresponding to the result of judgment at the abovementioned step 30N, providing a required follow-up learning at an optimum educational level. Through implementation of such educational strategies, the optimum education suited to the idiosyncrasy and the degree of understanding of the learner is capable of being executed. In addition, the process sequences of asking questions in estimating error causes for the learner utilized in this embodiment of the invention are shown in FIG. 8 and FIGS. 12 and 13 that will be described later (stored in memory of the instruction strategy planning unit 3).

In the following, process sequences to be executed by the error cause estimation means will be set forth with reference to FIGS. 12 and 13.

Figure 12:
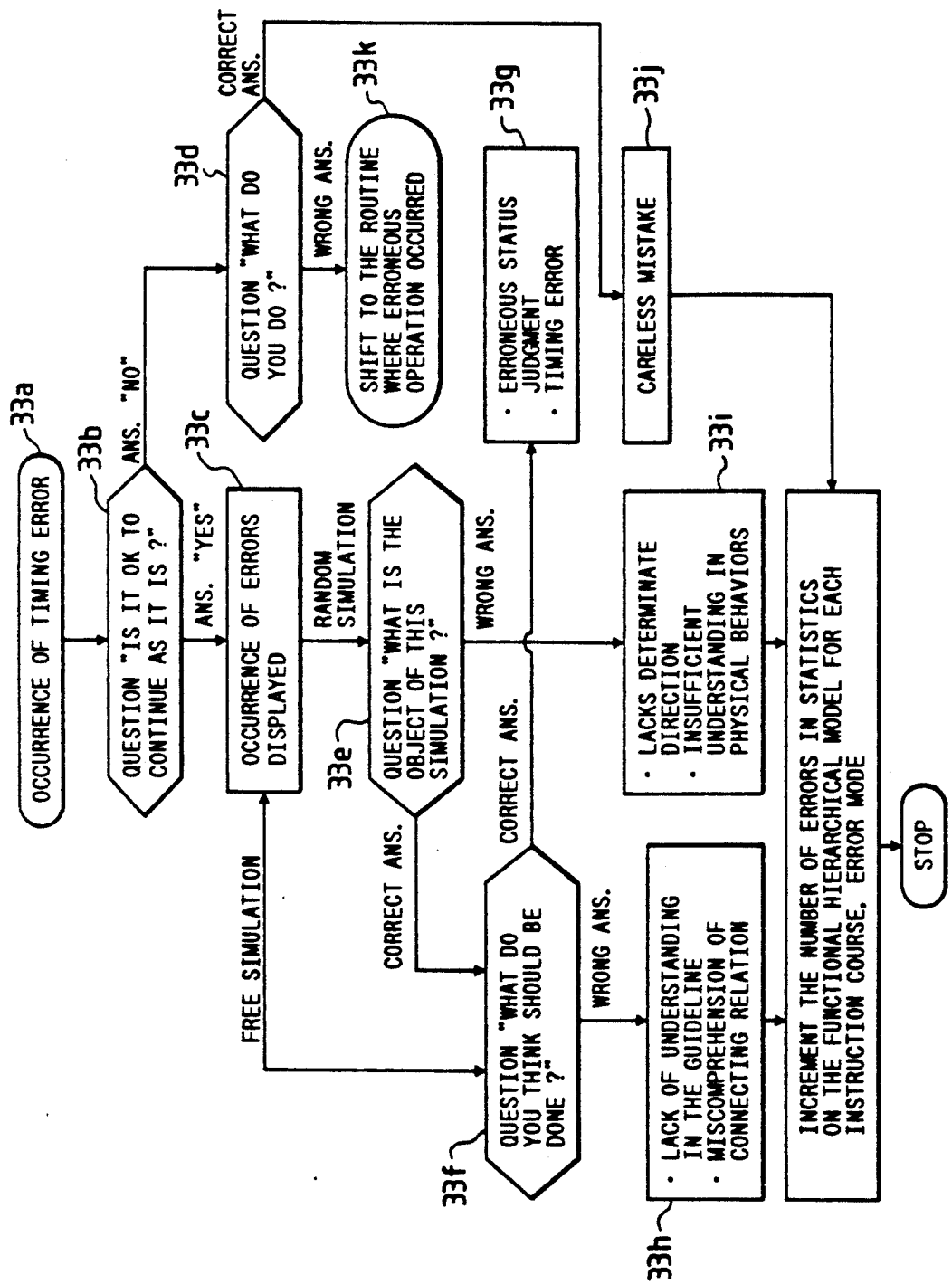
FIG. 12 shows process sequences for estimating causes of errors in the operation timing during simulation-based behavior comprehension learning.
Figure 13:
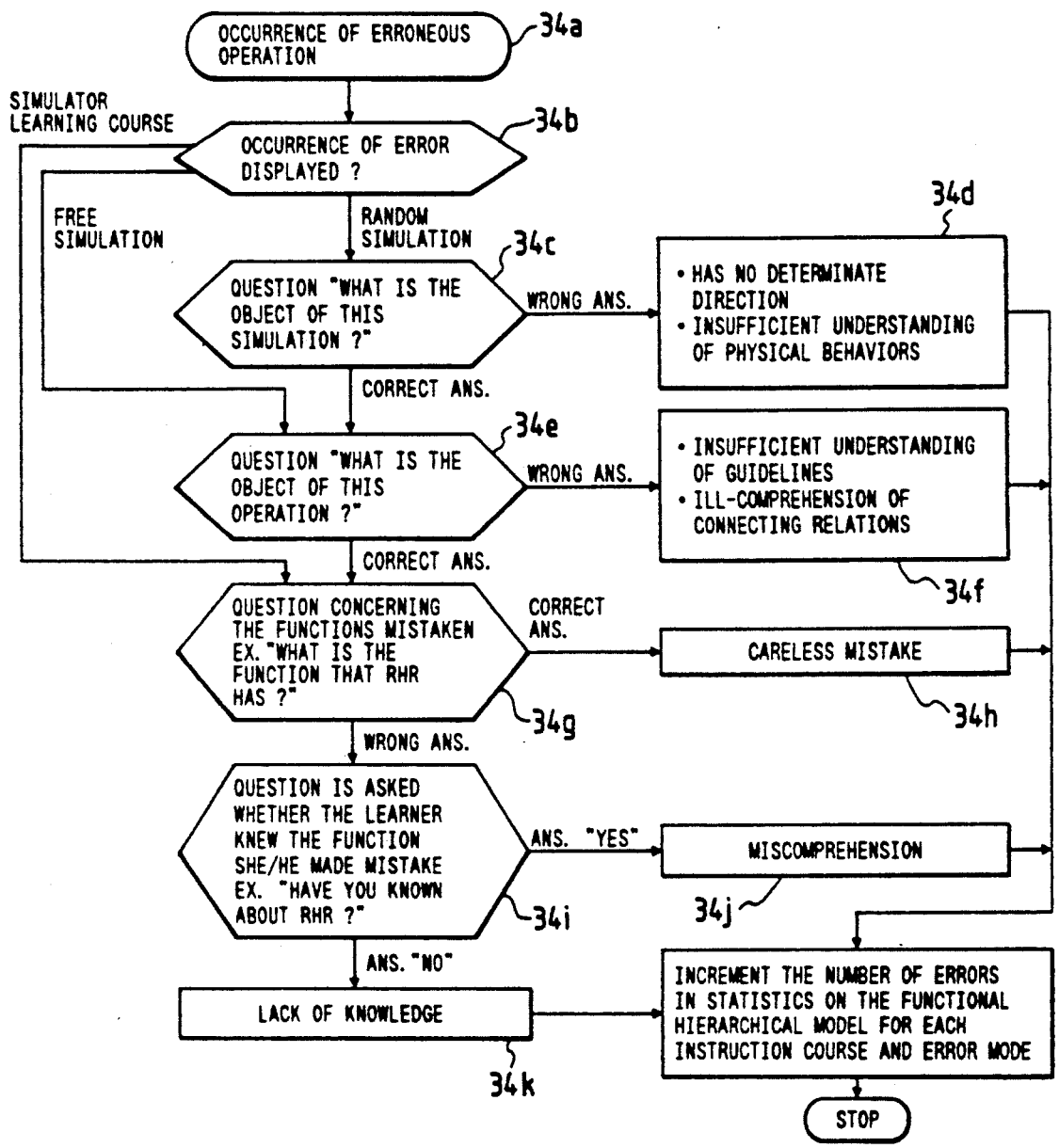
FIG. 13 shows process sequences for estimating causes of misoperations during simulation-based behavior comprehension learning.

Regarding the simulator-based training (education) in the courses 30E and 30F of FIG. 4, process sequences for asking questions to estimate the causes of errors when the learner makes a mistake in the operational timing are shown in FIG. 12. The contents of questions are displayed on the output unit 8, and answers to the questions are entered through input unit 7 by the learner. In case of training using the simulator 4, the contents of questions differ depending on whether it is the random simulation course 30F or the free simulation course 30E. On the basis of the results of the simulation entered from the simulator 4, it is judged whether there has arisen any operational timing error(s) during the execution of the simulator 4 (step 33a). When there occurred no operational timing error, the processing at step 33a is repeated. When an operational timing error has occurred, the question is asked; "Do you wish to continue to process as it is?" (step 33b). When the answer to this is "Yes", error occurrence is displayed and at the same time it is judged whether to take "free simulation" or to take "random simulation" (step 33c). When the random simulation has been executed, a question is asked; "What is the object of this simulation?" (step 33e). When the answer to this question was wrong, it is judged that the learner is "unable to show a determinate direction" in his/her answers, or has "insufficient understanding of physical behaviors" (step 33i). When the answer to the question at step 33e is correct, or when it is judged that a free simulation has been executed at step 33c, the question is asked; "What do you think you should do?" (step 33f). When the answer to this question is correct, it is judged as "status judgment error" or "timing error" (step 33g). When the answer to the question at step 33f is wrong, it is judged as due to "insufficient understanding of the guidelines" or "miscomprehension in connecting relationships of functions" (step 33h).

When the answer to the question at step 33b was "No", a question is asked; "What would you do?" (step 33d). When the learner responds correctly to the question, the error is judged as "careless error" (step 33j). When the response is wrong, it is judged as "status judgment mistake" or "timing error", and the sequence moves to step 34a in FIG. 13. When a judgment is made pertaining to steps 33h, 33i, or 33j, the number of errors in the error statistics of the learner's model is incremented for respective modules in a corresponding instruction course, and at the same time the data is entered into the memory unit 2 so as to store the contents of the judgment in the "contents of errors".

Process sequences for asking questions in order to estimate the causes of misoperations are shown in FIG. 13, when the learner makes a misoperation in the course of a simulator-based training in the courses 30D, 30E and 30F of FIG. 4. The contents of the questions are displayed on the output unit 8, and the responses to the questions are entered by the learner through input unit 7. Also with these process sequences, the contents of questions differ slightly between a random simulation course 30F and a free simulation course 30E. According to the result of simulation by the simulator 4 entered therein, it is judged whether there has been any erroneous operation done by the learner during the course of execution by the simulator 4 (step 34a). When some misoperation has occurred, it is displayed, and at the same time, it is judged which course has been taken; "simulator-based learning course?", "free simulation course?" or "random simulation course?" (step 34b). When a random simulation has been done, a question is asked; "What is the object of this operation?" (step 34C). When the answer to this question is wrong, it is judged that the learner has "no determinate direction", or has "insufficient understanding of the physical behaviors" (step 34d). When the response to the question at step 34C is correct, or when it is judged as a free simulation at step 34b, a question is asked; "What is the object of your having done this operation?" (step 34e). When the question was not answered correctly, it is judged as "lack of understanding of guidelines" or "miscomprehension of connecting relationships" (step 34f). When the question at step 34e is answered correctly, or when it is judged at step 34b that a simulation learning has been under way, questions regarding the functions the learner has failed to answer are asked (step 34g). When the learner answers these questions correctly, the error is judged due to "careless error" (step 34h). When the learner fails to answer correctly the questions at step 34g, questions are asked whether the learner has really known the function(s) which she/he failed to answer or not (step 34i). In case the learner did not know, it is judged as the "lack of knowledge" (step 34k), and in case the learner has known, it is judged as the "miscomprehension" (step 34j), respectively. When a judgment is made pertaining to steps 34d, 34f, 34h, 34j or 34k, the error data is entered into the memory unit 2 so that the number of efforts in the error statistics for the learner's model may be incremented for respective modules in a corresponding instruction course, and that the contents of the judgment may be stored in the "contents of errors" in the learner's model.

FIG. 15 shows an example of information displayed according to the embodiment of the invention on the output unit 8 on completing the sequences at step 30N or reeducation training in FIG. 4. The information thus displayed appraises the learner's performance (achievement) in the current course of training (educational steps), helping the learner to comprehend his/her own understanding. Further, advice may be given for the next course of education in accordance with the achievement in the current course.

Among the learners, there are those who are adept at understanding the contents of a text by reading, and also there are those who, though not good at understanding the contents of a text by reading, are good at understanding plant operations and plant behaviors through actual experiences. As has been set forth previously, an embodiment of the present invention is capable of providing selectively a pertinent follow-up instruction course suitable for each learner in which the idiosyncrasy of each learner as to what type of learning she/he is good at or not is reflected, after executing a series of teaching including both the subject learning and the simulation-based behavior comprehension learning, and according to the result of learning of such (error statistical data, data indicating the degree of understanding of the learner and so on). Thereby, in contrast to an educational method requiring both a subject knowledge education and a simulator-based instruction, the present invention is capable of providing a more flexible instruction method suited to the idiosyncracies and the degrees of understanding of the learners.

In case of operating a plant, in particular, a nuclear power plant, it is prerequisite to master the knowledge regarding the ways of operations to be followed utilizing the subject knowledge and applying the same in a field, further accounting for the actual behaviors in the plant. According to the present invention, however, because the abovementioned flexible instruction training is capable of being provided, the learner is readily capable of integrating or combining both of the above domains of knowledge, and in particular doing so in a shortest period of time suited to the idiosyncrasy of the learner. Because the embodiment of the invention is provided with means for comprehending the degrees of understanding by the learner of the subject learning and the behavior comprehension learning through simulation (for instance, means for estimating the cause of errors done by the learner as shown in FIGS. 8, 12, and 13), the degrees of understanding of such may be fully grasped to be reflected properly on the next course of instruction.

Further, if an object of learning is concerned with physical behaviors, it is important to make a concept of physical phenomena understood on a microscale to the learner. Thereby, it is effective to utilize a goal oriented model for a concept model to make it more conceivable of the object. For instance, in case of a process plant, through the use of a functional hierarchical model in which goals of operations for an object and functions to realize the same are hierarchically arranged, two different kinds of knowledge regarding the physical behaviors and operational procedures/the contents of operations is capable of being understood and learned quickly and generally.

As stated above, since the embodiment of the invention is capable of judging pass or failure of the learner by appraising the degree of understanding for each module, it is not necessary, even in case of a failure, to execute reeducation of the curriculums of every modules in the failed instruction course, but rather to reeducate only the failed module(s). This lessens the burden of learning for the learner, permits an exhaustive reeducation in those portions where the learner lacks understanding, achieving the effect of reeducation in a shorter period of time. As shown in FIG. 14A and 14B, because the embodiment of the invention determine the degrees of understanding for respective types of instruction in each module, an instruction course(s) to be taught again to the learner is capable of being chosen using the degrees of understanding. Hence, the embodiment of the invention is capable of specifying an instruction course(s) in need of reeducation and a module(s) in such instruction course(s), respectively, thus providing a carefully thought-out instruction strategy for each learner.

An intelligent computer assisted instruction system (ICAI) embodying the present invention is capable of providing advanced individual instruction, effecting access to two-way initiative interactive dialogues.

In advanced individual instruction (instruction by individual learner in accordance with the degree of understanding), the foregoing learner's mode is required. The learner's model has data regarding the learner's learning history and the degree of understanding attached to a functional hierarchical model which represents an ideal learner's model, and on a coupling model connecting associated operational procedures therebetween. Through application of the data on the learner's model, an instruction course suited to each learner is capable of being provided as described above, effecting an individual instruction in curriculums of the course. In the formulation of a learner's model, it is preferred to utilize the artificial intelligence (AI) method. In principle, the learner's model is capable of being implemented by taking statistics on the number of errors per the number of trials for every basic function in a plant, and by reflecting the statistics data thereupon. According to the data on the learner's model, the learning history is known from the number of trials, and the degree of understanding is known from the number of errors, with respect to every basic function. These trials refer to the questions and answers, examinations, and simulator operations, while the number of errors refers to the errors that occurred in these trials. In order to judge the degree of understanding in the simulation-based behavior comprehension learning, an error check function, in particular, for simulator operations should be provided. The result of judgment and statistics thus obtained is regarded as a learner's model.

In another embodiment, when conducting an appropriate follow-up instruction chosen according to this embodiment of the invention, to be executed for a particular learner(s), the contents of the curriculum for the appropriate instruction course are capable of being provided selectively in accordance with the degree of understanding which has been stored as the data of a learner's model for the corresponding learner. This is capable of being implemented by storing in memory unit 1 different levels of curriculums for each instruction course (curriculums of levels 1, 2, 3 and so on; higher levels in ascending order). The course selection means in the instruction strategy planning unit 3 specifies a level in the curriculum of an instruction course appropriately selected for the learner, according to the data designating the degree of understanding (error statistics or the contents of errors) contained in a corresponding learner's model stored in the memory unit 2. Instruction execution unit 6 retrieves the contents of the instruction for a corresponding curriculum from the memory unit 1 following the above specification to be displayed on an output unit 8 in sequences. Hence, a further advanced individual instruction optimized for each learner is capable of being provided.

A two-way initiative interactive dialogue (interactive dialogues between the learner and the system each taking initiatives) is available in the system embodying the invention. The invention is capable of displaying questions on the output unit 8 corresponding to the degree of understanding of the learner which are stored in the learner's model. Further, questions from the learner are capable of being asked at a level corresponding to the degree of understanding of the learner. This is because that, as described above, the system is capable of providing menus of questions to the output unit 8 in accordance with the degree of understanding of the learner.

Figure 16:
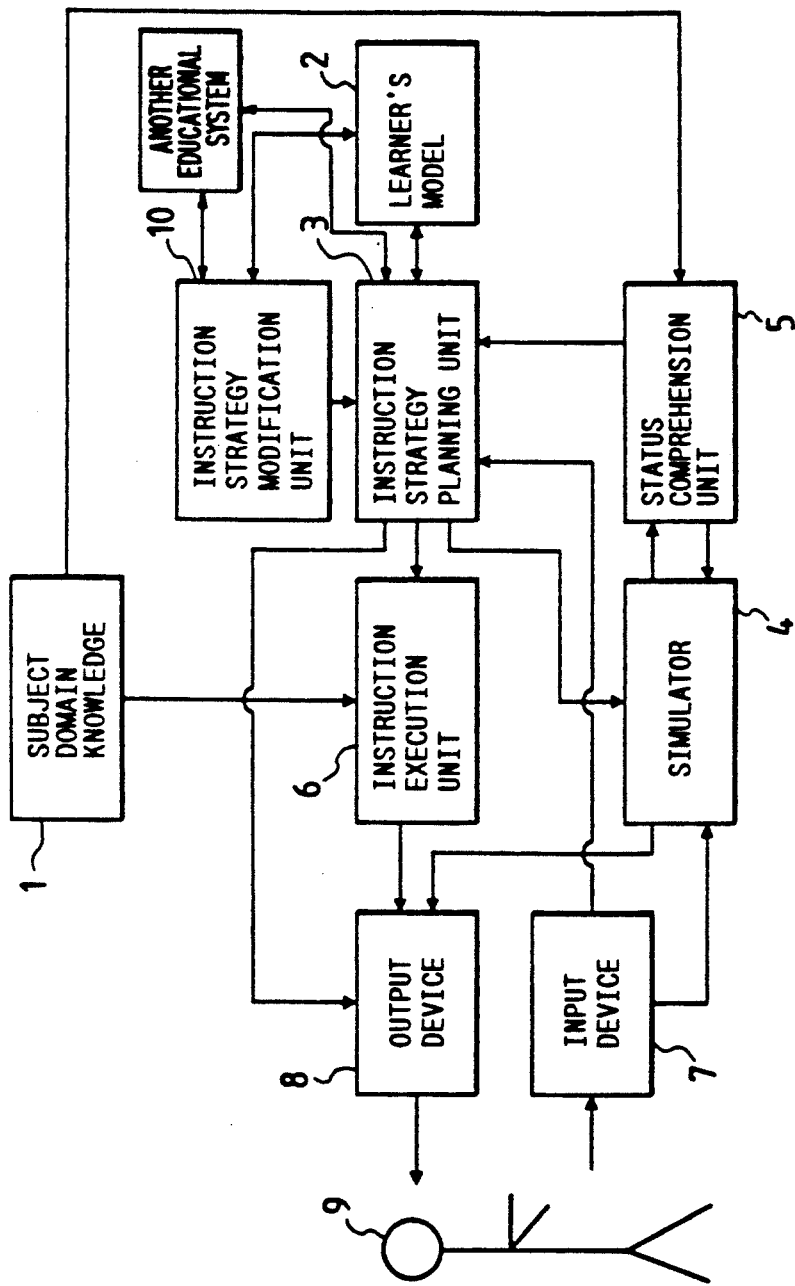
FIG. 16 shows a schematic block diagram of another embodiment of the present invention.

Another embodiment of the present invention will be described below with reference to FIGS. 16 and 17. This embodiment of the invention aims at providing a further improved instruction system. For this purpose, the instruction strategy is updated in accordance with the progress in the degree of understanding of the learner. This embodiment of the invention is similar to that shown in FIG. 1 but is further provided with an instruction strategy modification (updating) unit 10. The instruction strategy modification unit 10 includes means for dealing with two different types of modification as shown in FIG. 17, each means being assigned to modify the instruction strategy, respectively as follows.

(1) Statistics on all of the learners—for modification of the instruction strategy from a global view point at the system side. (2) Statistics on individual learners—for modification of the instruction strategy to optimize for each individual learner.

Figure 17:
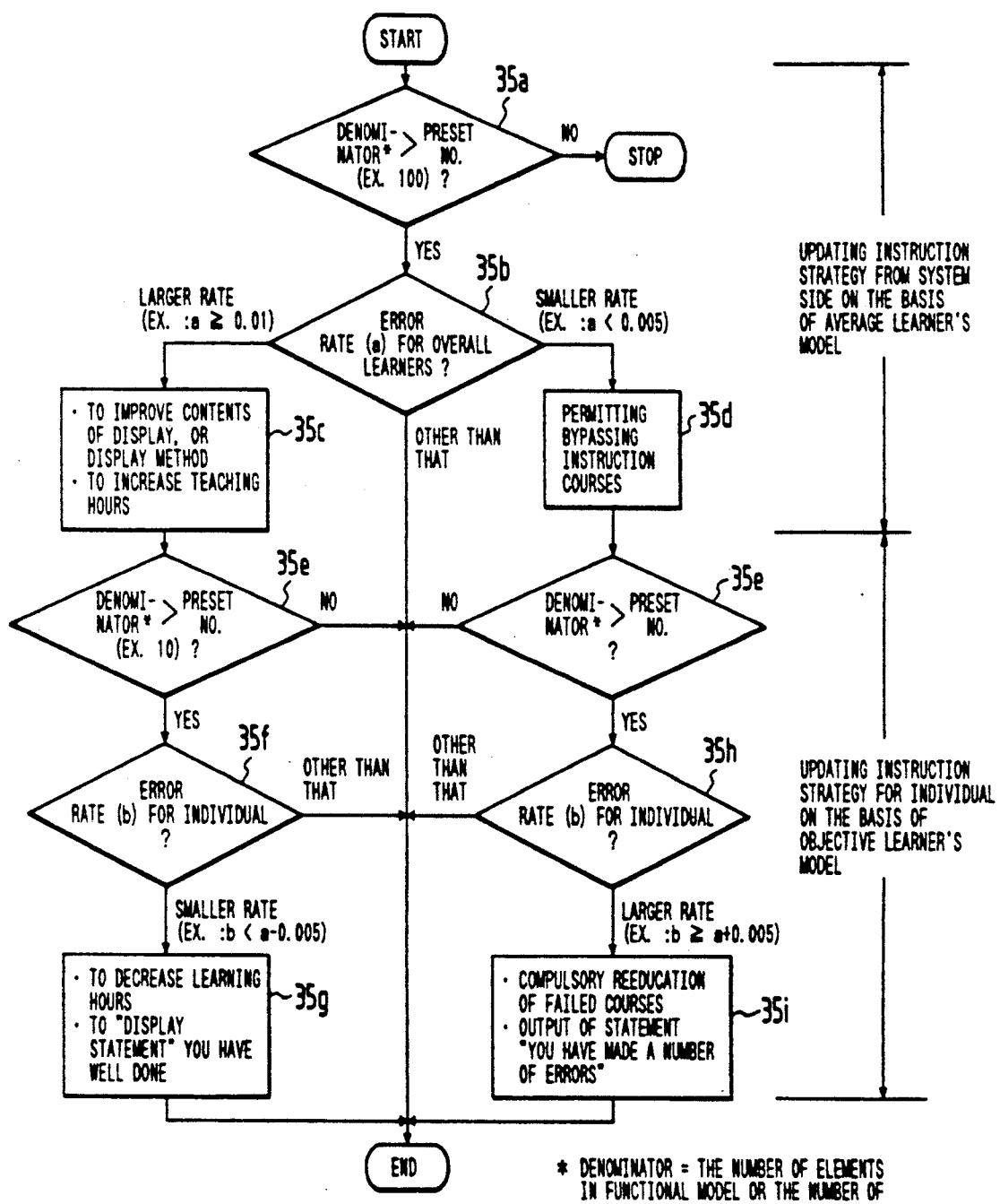
FIG. 17 explains process sequences for modifying an instruction strategy to be executed in the instruction strategy modification unit 10 of FIG. 16.

Steps 35a, 35b, 35c and 35d in FIG. 17 are means for modifying the instruction strategy from the system side based on the data on an average learner's model according to the first statistics data. This data is obtained by error statistical means of the instruction strategy planning unit 3, which not only obtains error statistics for each learner but calculates average error statistics for all of the members of learners who took the course according to the invention. The data on the average error statistics covering the entire set of learners is stored in an average learner's model in the memory unit 2. The average learner's model contains data on an average degree of understanding, average error statistics and so on for a total member of learners who received the instruction through the invention. In other words, the average learner's model contains average data obtained by averaging all of the learners' models. Each of the steps 35a, 35b, 35c and 35d retrieves data from the average learner's model in the memory unit 2 to execute corresponding processing. Steps 35e, 35f, 35g, 35h and 35i are means for modifying an instruction strategy for a particular individual based on the data of the learner's model for the particular learner stored in the memory unit 2.

The process sequences in FIG. 17 will be described in the following. First, it is judged whether the number of trials (denominator) for all learners has reached a prescribed number or not (step 35a). If it is judged "Yes", a total error ratio is estimated for the entire set of members (step 35b). If there occurred a number of errors, an improvement order to improve the instruction strategy at the system side is transmitted to the education instruction means in the instruction strategy planning unit 3 (step 35c). The education instruction means issues an instruction to the instruction execution unit 6 or the simulator 4 to execute the instruction courses excepting the module(s) corresponding to the above. Then, it makes a judgment if the number of trials (denominator)

for each learner has reached the prescribed number (step 35e). When an error factor to be estimated (step 35f) for each learner is small, it is displayed on output unit 8 (step 35g). To the contrary, when an error factor is estimated to be large (step 35h), it is displayed on the output unit 8 (step 35i). At step 35i, for a module(s) having a large error factor, an instruction is issued that "reeducation is necessary". On receiving the instruction, the course selection means issues an instruction to the instruction execution unit 6 or simulator 4 to execute reeducation of the module(s) specified as such, even though it was previously judged that reeducation was not necessary (when it passed exam).

FIGS. 18–20 illustrate exemplary tables which show for an individual learner how the reeducation curriculum is formed. Assume, for this example, that a number of students have taken both the basic concept course, the procedure course, and the simulation course. The individual learner has also taken these courses. The error statistical data has been gathered which categorizes the errors, the "error modes", for each of the errors made by the individual learner, and by the average student.

FIG. 18 shows the understanding level for each type of mistake made by a learner and compares it to the average student's level. The different types of error modes are listed in column 1, the individual student's level score is in column 2, the average student's level score is in column 3. The difference score is in column 4. A student's level is simply the percentage of correct responses (Z) divided by the number of attempts or questions (n) in the equation: $Z/n \times 100$. The average student's level is determined by adding the scores for the entire set of students and dividing by the number of students. Alternatively, an instructor can set the average student's level according to an expectation of performance of the individual learner's levels.

The difference score is found by dividing the individual learner's score with the average student's score and multiplying by 100. A difference of less than or equal to 75 is considered a poor level for an individual learner when compared to the average student, while a level between 75 and 125 is considered fair, with a difference greater than 125 being considered good. In this example, the individual learner has achieved fair results within all of the different error modes except for "miscomprehension in the connection relations of the functions." In that error mode, the exemplary individual learner has achieved a poor score.

FIG. 19 shows the understanding level for the different types of courses and compares the individual learner's level of understanding versus the average student's level of understanding. The difference is calculated in the same manner as in FIG. 18. A difference under 90 is considered poor, while a score between 90 and 110 is fair, with a difference level greater than 110 being considered good. The subject learning is performed in the basic concept course and in the procedure course, while simulation learning is performed in the simulation course. In this example, the individual learner has performed relatively poorly on the simulation course in comparison to the average student.

FIG. 20 shows how the tutoring strategy (or reeducation strategy) is selected based upon the understanding levels obtained from FIGS. 18 and 19. In our example, the individual learner has performed poorly in "miscomprehension in the connection relations of the functions." If the individual learner had performed either good or fair for each of the error types as shown in FIG. 19, then the entry is "K, TG" indicating that the reeducation would include the basic concept course and the procedure learning course. However, in the example given for the individual learner as shown in FIG. 19, this individual learner fared poorly on the simulation course. Thus, the appropriate entry in the table of FIG. 20 is formed by the intersection of the "miscomprehension and the connection relationships of the functions" and the "simulation course." For this entry, K, TG, and SG are all part of the reeducation curriculum. This includes the basic concept course, the procedure learning course, and the simulator-based learning course. These courses are chosen because the individual has demonstrated poor understanding of basic concepts due to insufficient comprehension in connection relationships of the functions, (K, TG), and has also demonstrated insufficient skill in simulation situations (SG). The reeducation (or tutoring strategy) has thus been determined from the understanding level for each error mode and the understanding level for each error type for the individual learner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An intelligent education and simulation system comprising:
    text teaching means for teaching procedure and physical process of subject domain knowledge to a learner;
    simulation means for providing an actual physical process situation experience and response using proper procedure to said learner;
    comprehension means for determining an understanding level of said learner by integrating results from said text teaching means with results from said simulation means; and
    educational execution means for selectively reactuating at least one of said text teaching means and said simulation means in response to said understanding level being below a predetermined value.

2. An intelligent education and simulation system according to claim 1, wherein said simulation means comprises an output unit, an input unit into which operations are input by said learner in response to a simulation situation, education instruction means for executing a curriculum containing a plurality of education subjects based on said simulation situations, a simulator for performing said simulation situations complying with a procedural instruction and evaluation means for evaluating an understanding level of said learner through answers and operations said learner has inputted from said input unit.

3. An intelligent education and simulation system according to claim 2, wherein said evaluation means comprises error checking means for determining the existence of errors in said answers and operations.

4. An intelligent education and simulation system according to claim 2, wherein said error checking means comprises means for outputting at least one result on said output unit.

5. An intelligent education and simulation system according to claim 3, wherein said error checking means comprises means for inferring causes of said errors.

6. An intelligent education and simulation system according to claim 1, wherein said comprehension means comprises a functional hierarchical model.

7. An intelligent education and simulation system according to claim 1, wherein said text teaching means comprises output means, input means, educational instruction means for executing a curriculum containing a plurality of educational subjects related to said subject domain knowledge using a text teaching method, text teaching execution mean for outputting on said output means information corresponding to said text teaching method according to said curriculum and evaluating means for evaluating an understanding level of said learner through answers and operations said learner has input to said first input unit.

8. An intelligent education and simulation system according to claim 1, wherein said education execution means comprise means for obtaining error statistical data of said learner, means for providing collected data on a plurality of learners, means for obtaining an average of error statistical data from said plurality of learners, and means for modifying education strategy of said learner based on said error statistical data and said average of error statistical data.

9. An intelligent education and simulation system according to claim 1, wherein said educational execution means comprises means for obtaining understanding of said learner from another educational system.

10. A method for teaching system operation using an intelligent education and simulation system having a computer, said method comprising the steps of:
obtaining understanding of a learner of procedure and physical process of subject domain knowledge which has been previously taught to said learner by a text teaching means;
obtaining understanding of said learner of an actual physical process simulation situation experience and response using proper procedure which has been previously presented to said learner by a simulation means;
comprehending an understanding level of said learner by integrating said understanding of subject domain knowledge and said understanding of simulation situation experience and response from a comprehension means; and
selectively structuring a reeducational curriculum of at least one of said subject domain knowledge and said simulation situation experience and response for said learner in response to said understanding level being below a predetermined value from an educational execution means.

11. A method according to claim 10, wherein said step of structuring includes classifying causes of errors into carelessness, lack of knowledge, miscomprehension of concept and miscomprehension in the connection relationship of functions.

12. A method according to claim 11, wherein said subject domain knowledge and said simulation situation experience and response are related to the same subject matter.

13. A method according to claim 12, wherein said subject domain knowledge comprises basic concept which assists said learner in comprehending basic concepts, and procedure education which assists said learner in comprehending of said system operation.

14. A method according to claim 10, wherein said step of obtaining said understanding of subject domain knowledge comprises outputting on display means subject information corresponding to said subject domain knowledge, obtaining answers from said learner in response to said subject information and evaluating said answers to said subject information, and wherein said step of obtaining said understanding of simulation situation experience and response comprises outputting on said display mans simulation information corresponding to said simulation situation experience and response, obtaining a response to said simulation information and evaluating said response to said simulation information.

15. A method according to claim 10, wherein said step of structuring includes classifying causes of errors into lack of basic knowledge, insufficient memory and insufficient understanding of physical behaviors, and structuring said re-educational curriculum to emphasize said subject domain knowledge in response to said causes of errors being deemed to be one of said lack of basic knowledge and insufficient memory, and structuring said re-educational curriculum to emphasize said simulation situation experience and response in response to said causes of errors being deemed to be insufficient understanding of physical behaviors.

16. An intelligent education and simulation system comprising:
a display unit;
an input unit;
educational instruction means for issuing an execution instruction to execute a curriculum containing contents regarding education based on the text teaching and simulation of an educational object;
text teaching execution means for outputting on said display unit information corresponding to said text teaching complying with said execution instruction;
a simulator which performs a simulation relating to said text teaching information complying with said execution instruction and outputs information obtained through the simulation on said display unit;
comprehension means for comprehending the learner's understanding of said curriculm with respect to each of the text teaching and the simulation through appraisal of information the learner has provided to said input unit; and
re-educational means for choosing at least a part of said text teaching and said simulation to be repeated according to the degree of understanding of the learner.

17. An intelligent education and simulation system comprising:
a display unit;
an input unit;
a memory unit for storing information regarding text teaching and simulation of an education object;
educational instruction mean for issuing an execution instruction to execute a curriculum to provide education through said text teaching and simulation;
text teaching execution means for retrieving information corresponding to the text teaching according to an execution instruction from the memory unit, and displaying the information on the display unit;
the simulator for providing a simulation based on said execution instruction, and outputting the information obtained through the simulation onto said display unit;
comprehension means for evaluating a degree of understanding of a learner by integrating results from said text teaching means with results from said simulator; and
re-education means for optionally choosing at least a part of said text teaching and said simulation to be repeated according to the degree of the understanding.

* * * * *